(12) United States Patent
Ogawa

(10) Patent No.: US 7,629,780 B2
(45) Date of Patent: Dec. 8, 2009

(54) POWER SUPPLY UNIT AND PRINTING APPARATUS WITH A SUPPLEMENTAL POWER SUPPLY UNIT

(75) Inventor: Kazuo Ogawa, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 365 days.

(21) Appl. No.: 11/560,955

(22) Filed: Nov. 17, 2006

(65) Prior Publication Data

US 2007/0170898 A1  Jul. 26, 2007

(30) Foreign Application Priority Data

Nov. 21, 2005 (JP) .............................. 2005-335889
Feb. 3, 2006 (JP) .............................. 2006-026774

(51) Int. Cl.
  *G05F 1/577* (2006.01)
(52) U.S. Cl. ....................................... 323/267
(58) Field of Classification Search .............. 323/267, 323/268, 271, 282, 285, 288; 363/142; 347/5, 347/14, 222

See application file for complete search history.

(56) References Cited

U.S. PATENT DOCUMENTS

| | | | |
|---|---|---|---|
| 6,542,705 B2 | 4/2003 | Fujita et al. | |
| 6,663,209 B2 * | 12/2003 | Yoshida | ........................ 347/14 |
| 7,002,112 B2 | 2/2006 | Kishi et al. | |
| 7,010,255 B2 | 3/2006 | Yura et al. | |
| 7,054,570 B2 | 5/2006 | Kishi et al. | |
| 7,116,923 B2 | 10/2006 | Kishi et al. | |
| 7,127,189 B2 | 10/2006 | Takamatsu et al. | |
| 7,130,555 B2 | 10/2006 | Kishi et al. | |
| 7,215,106 B2 * | 5/2007 | Sato | ............................ 323/282 |
| 7,419,236 B2 * | 9/2008 | Masuda | ........................ 347/14 |
| 2004/0245235 A1 | 12/2004 | Kishi et al. | |
| 2004/0245241 A1 | 12/2004 | Kishi et al. | |
| 2005/0123314 A1 | 6/2005 | Satoh | |
| 2005/0123315 A1 | 6/2005 | Kishi et al. | |
| 2005/0139584 A1 | 6/2005 | Kishi et al. | |
| 2005/0167420 A1 | 8/2005 | Sato et al. | |
| 2005/0175368 A1 | 8/2005 | Matsusaka et al. | |
| 2005/0175370 A1 | 8/2005 | Matsusaka et al. | |
| 2005/0189923 A1 | 9/2005 | Ohishi et al. | |
| 2005/0191078 A1 | 9/2005 | Kishi et al. | |
| 2005/0220474 A1 | 10/2005 | Sato et al. | |
| 2005/0232651 A1 | 10/2005 | Sato et al. | |
| 2006/0024079 A1 | 2/2006 | Sato et al. | |
| 2006/0039713 A1 | 2/2006 | Kishi et al. | |
| 2006/0051111 A1 | 3/2006 | Kishi et al. | |
| 2006/0051112 A1 | 3/2006 | Matsusaka et al. | |
| 2006/0051113 A1 | 3/2006 | Kishi et al. | |

(Continued)

FOREIGN PATENT DOCUMENTS

JP  2004-236492  8/2004

(Continued)

*Primary Examiner*—Matthew V Nguyen
(74) *Attorney, Agent, or Firm*—Oblon, Spivak, McClelland, Maier & Neustadt, L.L.P.

(57) ABSTRACT

A power supply unit and a printing apparatus, including a first power supply unit and a second power supply unit. The second power supply unit accumulates a power from an outlet and converts an accumulated power to a DC power. An output current from the second power supply unit is added to an output current from the first power supply unit.

20 Claims, 21 Drawing Sheets

U.S. PATENT DOCUMENTS

| | | |
|---|---|---|
| 2006/0051119 A1 | 3/2006 | Kishi et al. |
| 2006/0051120 A1 | 3/2006 | Kishi et al. |
| 2006/0051121 A1 | 3/2006 | Matsusaka et al. |
| 2006/0127118 A1 | 6/2006 | Kishi et al. |

FOREIGN PATENT DOCUMENTS

| | | |
|---|---|---|
| JP | 2005-221674 | 8/2005 |
| JP | 2005-221675 | 8/2005 |
| JP | 2005-221676 | 8/2005 |
| JP | 2005-221677 | 8/2005 |

* cited by examiner

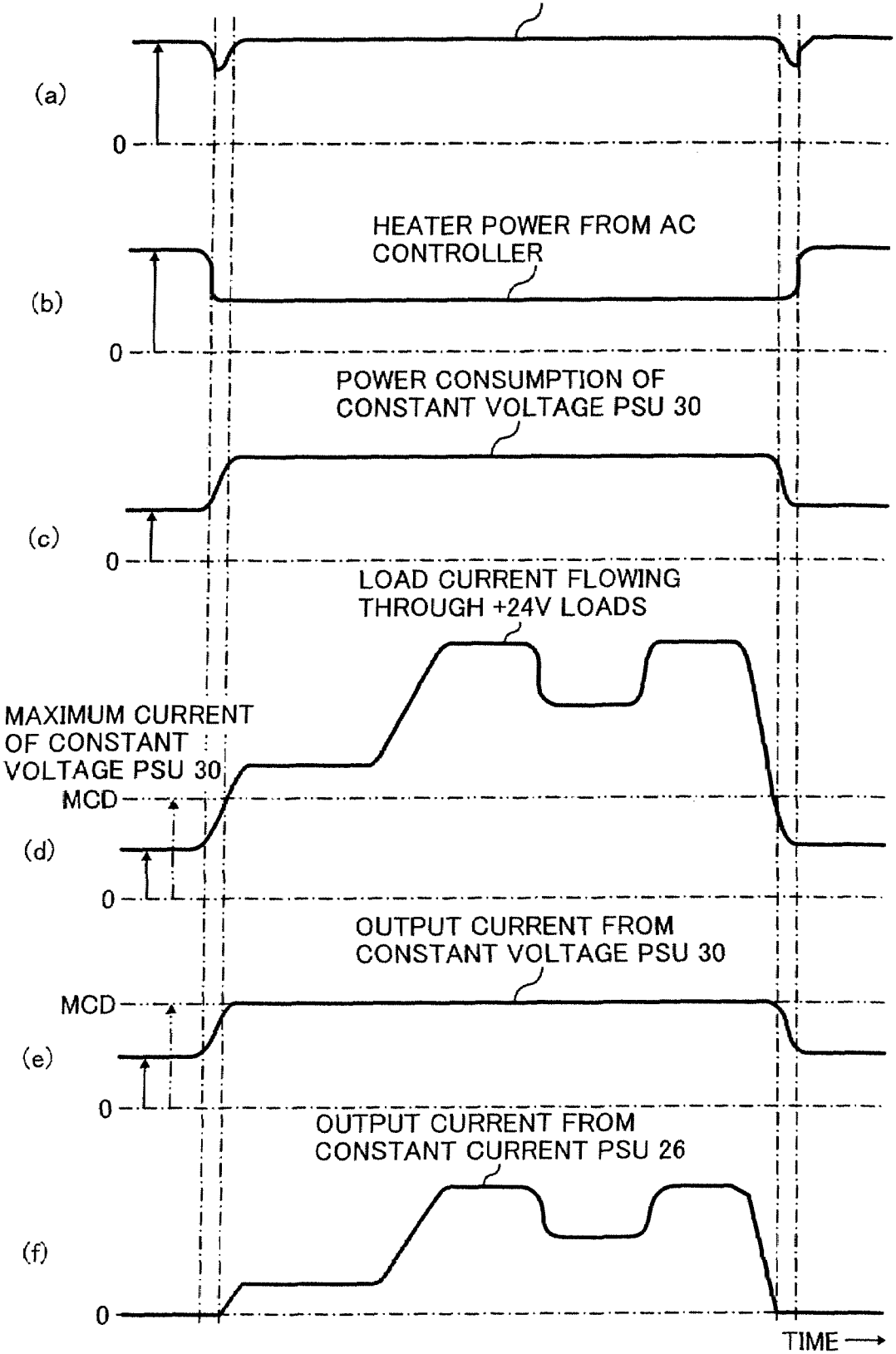

POWER SUPPLY UNIT AND PRINTING APPARATUS WITH A SUPPLEMENTAL POWER SUPPLY UNIT

CROSS-REFERENCE TO RELATED APPLICATION

This patent specification is related to and claims priority under 35 U.S.C. § 119 to Japanese patent applications No. 2005-335889, filed on Nov. 21, 2005 and No. 2006-26774, filed on Feb. 3, 2006, in the Japanese Patent Office. The entire contents of both priority applications are hereby incorporated herein by reference.

BACKGROUND OF THE INVENTION

1. Field of the Invention

This invention generally relates to a power supply unit and a printing apparatus. More particularly, this invention relates to a main power supply unit and a supplemental power supply unit for a printing apparatus.

2. Description of the Background Art

Typical printing apparatuses of this field are disclosed, for instance, Japanese Open-Laid Patent 2004-236492 and Japanese Open-Laid Patent 2005-221674. These apparatuses have both a main power supply unit and a supplemental power supply unit, wherein the printing apparatuses switch a source of DC power provided to a part of the printing apparatus from the main power supply unit to the supplemental power supply unit when the total amount of DC power consumption exceeds the rated power of the outlet. However, an output voltage of the main power supply unit and an output voltage of the supplemental power supply unit have slightly different voltages.

This voltage difference can cause a malfunction of motor movements (e.g., an unexpected motor stop or uneven rotation of a motor). Further, for a color printing apparatus, the voltage difference can result in rotations between motors which leads to a color registration difference.

Other problems associated with unsynchronized switching of power between two power supply units is that it requires a grouping of DC loads in the printing apparatus. One group is always supplying power from the main power supply unit and the other group is supplying power from both the main power supply unit and the supplemental power supply unit. This grouping often restricts the design of the printing apparatus.

SUMMARY OF THE INVENTION

In light of the above described problems, the present invention provides a power supply unit for a printing apparatus including a first power supply unit configured to convert an AC power from an outlet into a first DC power, and a second power supply unit configured to accumulate the AC power from the outlet and to convert an accumulated power to a second DC power. An output current of the second power supply unit is added to an output current of the first power supply unit and both output currents are supplied to DC loads simultaneously.

BRIEF DESCRIPTION OF THE DRAWINGS

In order that the invention may be more clearly understood, it will now be disclosed in greater detail with reference to the accompanying drawings, wherein:

FIG. 8 is a chart illustrating a relationship of (a) an AC power consumption from an outlet 27, (b) an AC power consumption of an AC controller 31, (c) an AC power consumption of a first power supply unit 30, (d) a load current flowing through the +24V loads 35, (e) an output current of the first power supply unit 30, and (f) an output current of a second power supply unit 26.

DETAILED DISCLOSURE OF EXAMPLE EMBODIMENTS

Figure 1:
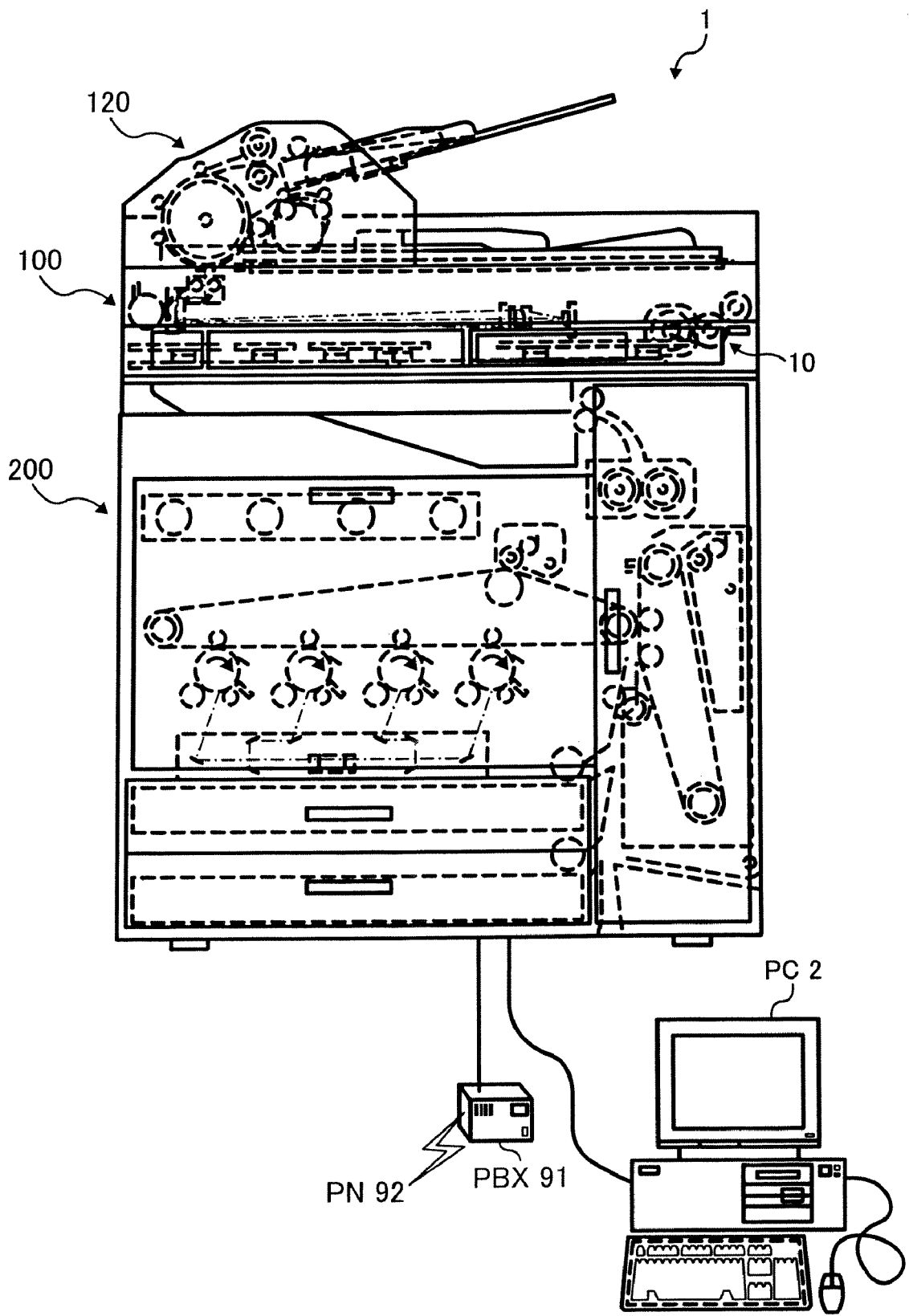
FIG. 1 is an overall view illustrating a printing apparatus 1, a PC 2, and a telephone switching apparatus 91.

Referring to FIG. 1, a printing apparatus 1 is described. As illustrated in FIG. 1, the printing apparatus 1 is provided with an automatic document feeder (ADF) 120, an operational panel 10, a scanner unit 100, and a printer unit 200. The operational panel 10 and the scanner unit 100 with the ADF 120 are separable from the printer unit 200.

The scanner unit 100 is provided with a scanner controller (not shown), which controls motors, clutches, and solenoids based on sensor inputs of the ADF 120 and the scanner unit 100. The scanner controller communicates with an engine controller 510 (shown in FIG. 3) directly or indirectly, and controls scanning of original documents.

A main controller 501 (shown in FIG. 3) in the printing apparatus 1 is connected to a personal computer (PC) 2 through a local area network (LAN) 3, and a facsimile control unit (FCU) 506 (shown in FIG. 3) in the printing apparatus 1 is connected to a telephone switching apparatus (PBX) 91 which provides a connection to a public telephone network (PN) 92.

Figure 2:
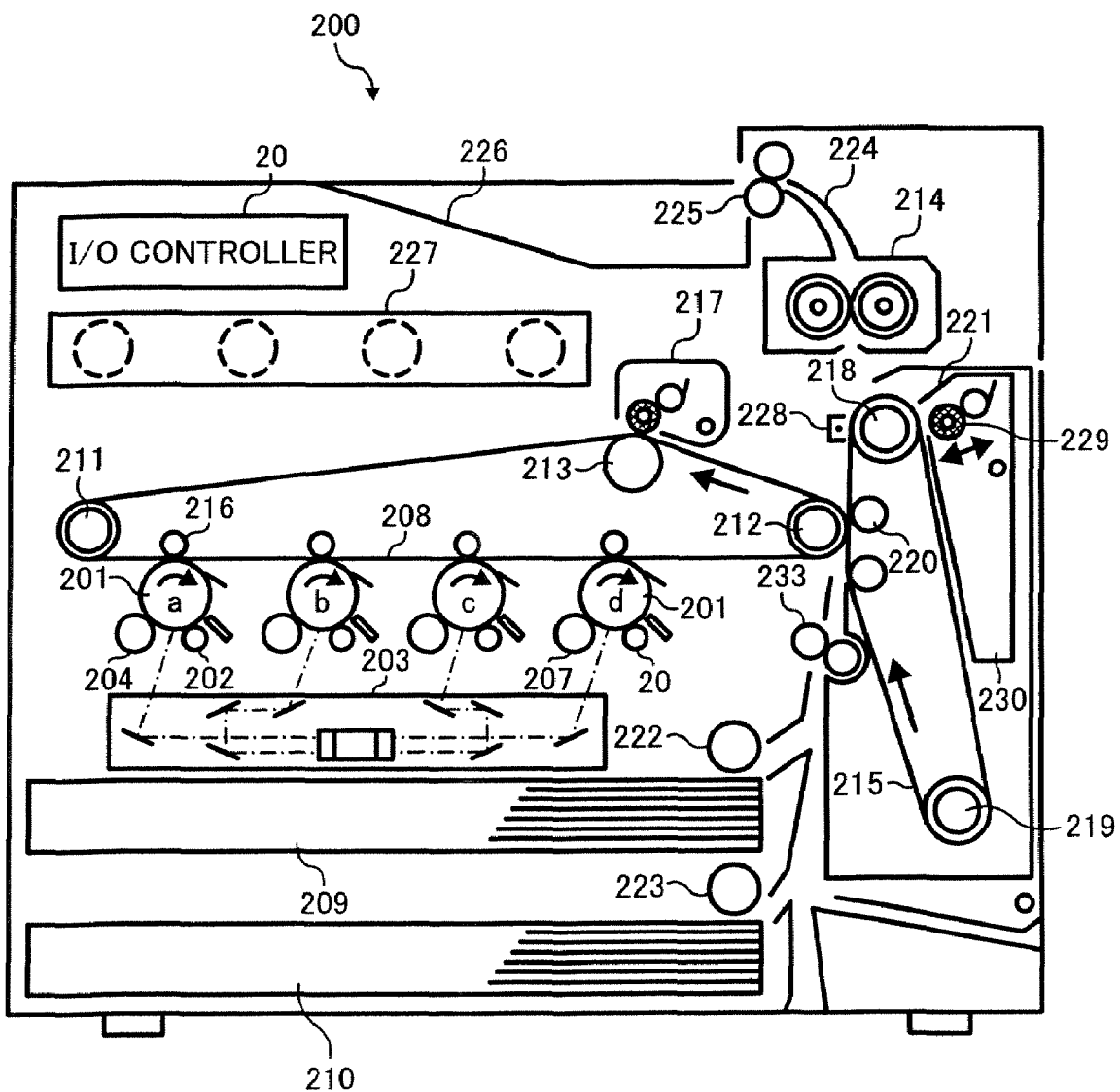
FIG. 2 is a perspective view illustrating a structure of a printer unit 200 of a printing apparatus 1.

FIG. 2 shows the components of the printer unit 200. The printer unit 200 is provided with a tandem type color image forming mechanism further explained below. The image forming mechanism for each color, including magenta (M), cyan (C), yellow (Y), and black (K) is placed from left to right along a first transfer belt 208. The first transfer belt 208 moves along the direction of the arrow shown in FIG. 2.

Around a rotatively supported photosensitive drum for magenta 201(a), a quenching unit (not shown), a charging unit 202, a developing unit 204, and a drum cleaning unit (not shown) are arranged. Between the charging unit 202 and the developing unit 204, a beam path for a laser beam from an optical writing unit 203 is placed. The structure of the image forming mechanism for each color is identical, except for the color of the toner in the developing unit 204. A part of each photosensitive drum 202 contacts the first transfer belt 208. In this embodiment, a drum shape photosensitive member (the photosensitive drum 202) is used, but in other embodiments a belt shape photosensitive belt can be utilized.

Supporting rollers 211, 213, and a driving roller 212 support the first transfer belt 208 by providing tension to the transfer belt 208. Inside of the first transfer belt 208, a first transfer roller 216 is placed on the opposite side of the photosensitive drum 201. Outside of the first transfer belt 208, a first cleaning unit 217 is provide. The first cleaning unit 217 cleans residual toner on the first transfer belt 208 after a toner image is transferred to a recording sheet or a second transfer belt 208.

The optical writing unit 203 emits four laser beams and each of the beams is modulated in accordance with corresponding color data. Four laser beams scan the surfaces of each of the photosensitive drums 201, which are evenly charged by the charging units 202, and form electrostatic latent images. In this embodiment, the optical writing unit 203 a laser scanning system, but an LED (Laser Emitting Diode) array system can also be used.

A second transfer belt 215 is located at the right side of the first transfer belt 208. The first transfer belt 208 and the second transfer belt 215 contact each other and form a transfer nip with a predetermined size. A driving roller 218 and a supporting roller 219 support the second transfer belt. A second transfer roller 220 is placed inside of the second transfer belt 215 and a second cleaning unit 221 and a transfer charging unit 221 are placed outside of the second transfer belt 215.

The second cleaning unit 221 cleans residual toner on the second transfer belt 215 after a toner image is transferred to a recording sheet. Sheet trays 209 and 210 contain the recording sheets and a feeding roller 222 or 223 conveys the uppermost sheet to a registration roller 233.

A fusing unit 214, a discharging guide 224, and a discharging roller 225 are provided in the upper area of the second transfer belt 215 and form the recording sheet path to a stacker 226. Toner cartridges 227 for each of the colors are placed in the area between the first transfer belt 208 and the stacker 226. Pump motors (not shown) convey the toners to the corresponding developing units 204.

An image forming process using the printer unit 200 in a duplex and color mode is now explained. A beam corresponding to the magenta image data from the optical writing unit 203 scans the surface of the photosensitive drum 201(a), which is evenly charged by the charging unit 202, and forms an electrostatic latent image. The electrostatic latent image is developed by the developing unit 204 and the toner image is formed on the photosensitive drum 201(a). The toner image is transferred by the transfer roller 216 from the photosensitive drum 201(a) to the first transfer belt 208 which makes synchronous movement with the photosensitive drums 201(a). The residual toner on the surface of the photosensitive drum 208 is removed by the drum cleaning unit and the photosensitive drum 201(a) prepares for the next image forming cycle.

The first transfer belt 208 holds the magenta toner image and moves to the left. The cyan toner image is formed on the photosensitive drum 201(b) by the image forming cycle described above and the cyan toner image is transferred on the magenta toner image by the transfer roller 216(b). The same image forming cycle occurs on the photosensitive drum 201 (c) and 201(d), respectively, and the yellow and black toner images are transferred to the first transfer belt 208 and finally a full color toner image is formed on the first toner belt 208. In a black mode, only the black toner image is formed by the image forming cycle described above. The color toner image on the first transfer belt 208 is transferred to the second transfer belt 215 by the second transfer roller 220 at the transfer nip. In the color mode, the toner images of each color are formed simultaneously and transferred to the first transfer belt 208 and form a color toner image.

The first transfer belt 208 continues to rotate and the color toner image for the other side of the recording sheet is also formed in the following image forming cycle. Synchronized with the movement of the first transfer belt 208, the feeding roller 222 or 223 starts to feed the recording sheet. The uppermost sheet of the plurality of recording sheets stocked in the sheet tray 209 or 210 is sent to the registration roller 233, and the registration roller 233 sends the recording sheet to the transfer nip. At the transfer nip, the color toner image is transferred to one side of the recording sheet by the transfer roller 220. After conveying the recording sheet in an upper direction, the color toner image on the second transfer belt 215 is transferred to the other side of the recording sheet by the transfer charger 228. The recording sheet feeding occurs in accordance with the color toner image transfer from the first transfer belt 208 and the second transfer belt 215.

The recording sheet is sent to the fusing unit 214 and the color toner images are fixed on both sides of the recording sheet. The recording sheet continues to be conveyed through the discharging guide 224 and the discharging roller 225 discharges the recording sheet to the stacker 226. In the duplex image forming process described above, the lower side image of the recording sheet on the stacker 226, which is transferred directly from the first transfer belt 208, is formed later during the image forming process and the upper side image of the recording sheet on the stacker 226, which is transferred from the second transfer belt 215, is formed earlier during the image forming process. Accordingly, in order to sort the page order, at first, the toner image of the second page needs to be formed on the first transfer belt 208 and transferred to the second transfer belt 215. Subsequently, the toner image of the first page is formed on the first transfer belt 208. Furthermore, the toner image transferred from the second transfer belt 215 is a mirror image on the photosensitive drums 201. Writing and reading control for a frame memory 521 (shown in FIG. 3) is implemented by the main controller 501 and are realized using the page control and mirror imaging processing described above.

After transfer of the color toner image from the second transfer belt 215 to the recording sheet, the second cleaning unit 221, which is provided with a brushing roller 229, a retrieving roller (not shown), and a blade (not shown), removes residual toner and paper dust. In FIG. 2, the brushing roller 229 is in the detached position. The brushing roller 229 is structured to be able to move in the direction of the arrow shown in FIG. 2 and can be attached to the second transfer belt 215. If the color toner image is not transferred to the recording sheet and is still on the second transfer belt 215, then the brushing roller 229 is maintained in the detached position. After transfer of the color toner image is completed, the brushing roller 229 is maintained in the attached position and cleans the residual toner and the paper dust on the second transfer belt 215. The retrieved residual toner and the paper dust are collected in a waste toner holder 230.

When implementing the image forming process in the duplex mode, the above-described process is typically completed using the printer unit 200. In order to obtain a one-sided print, there are two modes. One mode is called the second transfer belt mode, which uses both the first transfer belt 208 and the second transfer belt 215. The other mode is called the first transfer belt mode, which uses only the first transfer belt 208 to get a one-sided print.

When the second transfer belt mode is selected, the color toner image or the black toner image formed on the first transfer belt 208 is transferred to the second transfer belt 215, and is then transferred to the recording sheet. In this mode, the image is on the upper side of the recording sheet on the stacker 226.

When the first transfer belt mode is selected, the color toner image or the black toner image formed on the first transfer belt 208 is transferred directly to the recording sheet. In this mode, the image is on the lower side of the recording sheet on the stacker 226.

Figure 3:
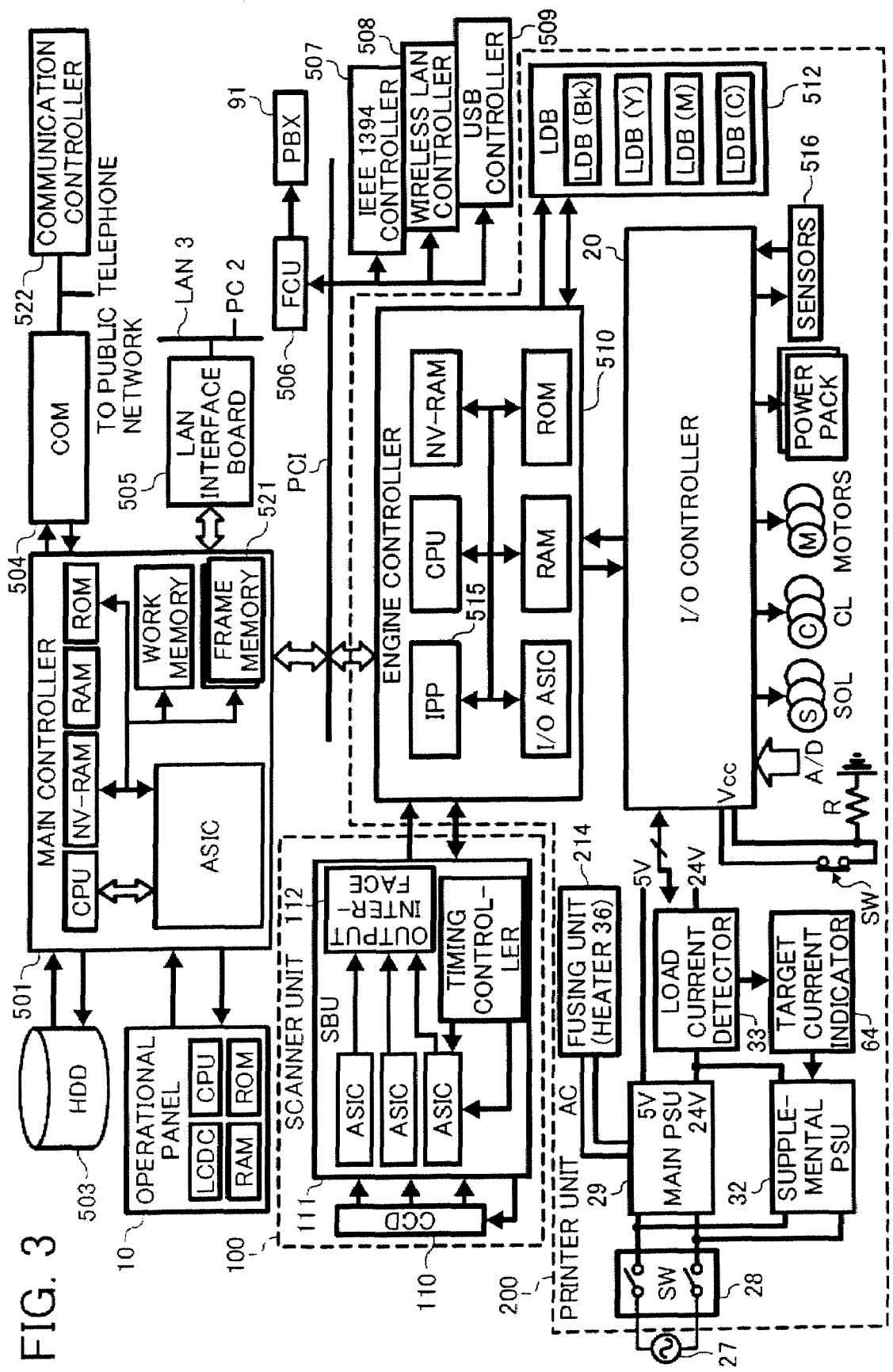
FIG. 3 is a block diagram illustrating the main electrical parts of a printing apparatus 1.

Referring to FIG. 3, a diagram of an electrical system of the printing apparatus 1 is shown. The electrical system is provided with a main controller 501 that controls the printing apparatus 1 entirely, the operational panel 10 connected to the main controller 501, a Hard Disk Drive (HDD) 503 that stores the image data, a communication control interface board (COM) 504 that communicate with an external device through an analog telephone line, a LAN interface board 505, a facsimile controller (FCU) 506, a IEEE 1394 controller 507, a wireless LAN controller 508, and a USB controller 509. These controllers are connected to a PCI bus 502. The engine controller 510 is connected to the main controller 501 through the PCI bus 502. An Input & Output (I/O) controller 20 is connected to the engine controller 510 and controls mechanical and electrical parts in the printing apparatus 1. A sensor board unit (SBU) 111 that processes image data of an original and a laser diode board (LDB) 512 that emits the laser beam based on the image data to the photosensitive drums 201 is also controlled by the engine controller 510.

The scanner unit 100 scans an original with a light source and focuses a reflection of the original to a color CCD (charge coupled device) 110. The CCD 110 changes an optical signal based on the reflection of the original to electrical red (R), green (G), and blue (B) image data.

The COM 504 communicates with an external remote diagnosis center (not shown) and enables a serviceperson to know where a malfunction occurs and the state of the malfunction is so as to repair the printing apparatus 1 in an early stage. The COM 504 also informs an external remote diagnosis center of the operating conditions.

The color CCD 110, shown in FIG. 3, is a 3-line color type CCD and generates an even pixel channel (EVENch), and an odd pixel channel (ODDch) of R, G, and B image signals. The signals are sent to an analog ASIC (application specific integrated circuit) on the SBU 111. The SBU 111 also has a timing controller for the analog ASIC. The analog ASIC is provided with a sample-and-hold circuit, an analog-to-digital converter, and a shading correction circuit, and changes the signals from the CCD 110 to the R, G, and B image data. An output interface outputs the R, G, and B image data to an IPP (image processing processor) 515.

The IPP 515 is a programmable operational processor that executes image processing such as character/photograph area recognition, ground level noise removal, scanner gamma conversion, filter processing, color correction, magnification/reduction, image modification, printer gamma correction, and multi-level output processing to the R, G, and B image data. After deterioration of the R, G, and B image date accompanying the signal processing is corrected in the IPP 515, the R, G, and B image date are stored in the frame memory 521 of the main controller 501.

The main controller 501 is provided with a CPU, a ROM, which stores programs for the CPU, a SRAM, which is used as a work area for the CPU, a NV-RAM, which has a built-in lithium battery and backs up the data stored in the SRAM when the power is turned off, an ASIC, which controls a data timing between the CPU and the ROM, SRAM, and NV-RAM, and also controls a data flow of a frame memory 521, and the work memory.

The main controller 501 offers many applications including for example a scanner application, a facsimile application, a printer application, and a copy application. The main controller also controls the entire printing apparatus 1, recognizes inputs from the operational panel 10, and displays settings at the operational panel 10.

Many units are connected to the PCI bus 103. On the PCI bus 103, the image data and control commands are transferred by a time-multiplexing method. The COM 504 interfaces between a communication controller 522 and the main controller 501. The interface between the COM 504 and the main controller 501 is an asynchronous full-duplex transmission interface and the interface between the COM 504 and the communication controller 522 is a standard RS-485 interface. The communication with the external remote diagnosis center is achieved through the COM 504.

The LAN interface board 505 is connected to the LAN 3. The LAN interface board 505 is provided with a physical layer (PHY) controlling chip, and interfaces between the main controller 501 and the LAN 3. The communication between the LAN interface board 505 and the main controller 501 uses a standard $I^2C$ interface, and the main controller 501 communicates with an external device through the LAN interface board 505.

The HDD 503 stores system programs for controlling the printing apparatus 1, system settings for printer mechanisms and image forming mechanisms, image data read by the scanner unit 100 or sent to the LDB 512, and document data from external devices. The HDD 503 is connected to the main controller 501 through the interface based on the ATA/ATAPI-4 standard.

On the operational panel 10, an LCD with a touch panel, 10 keys, a clear/stop key, a start key, an initial settings key, mode keys, a test printing key, and a power key are provided. There are also alphabet keys which are used to input for example a URL, a body of an email, a file name, a folder name, or a shortcut registration. In one embodiment the keys can include Japanese characters.

In the LCD area, application keys are arranged and display the status of the main controller 501 and the engine controller 510. The application keys are for selecting a copy application, a scanner application, a print application, a facsimile application, an image storing application, an editing application, an image registration application, and others. Also, input/output menus related to the selected application are displayed. For the copy application, for example, copy settings like duplex, magnification/reduction, number of copies, and the like are displayed. The status of the printing apparatus 1 for example, jammed, out of paper, and the like are displayed. When an operator touches the touch panel on the LCD panel, the operational panel 10 recognizes a position of the LCD and determines which key is selected. Then the operational panel 10 changes a color of the selected key and indicates which function is selected. In order to display more detailed functions, the operational panel 10 pops up another window based on an operator's selection.

The operational panel 10 is provided with a CPU, ROM, RAM, and an LCDC (LCD controller) which is an ASIC. The operational panel 10 controls processing of inputs from keys and outputs to the LCD. The ROM stores the control program of the operational panel 10 such that the operation panel 10 recognizes inputs from keys and displays information based on the inputs. The RAM is a working memory for the CPU. The operational panel 10 communicates with the main controller 501 by sending the operator inputs to the main controller 501 and displays the information to the operator based on the commands from the main controller 501.

Image data for each color (B, C, M and Y) from the frame memory 521 on the main controller 501 is sent to the LDB 512. In the LDB 512, current modulation is generated based on the image data and the modulated currents are supplied to laser diodes corresponding to each color on the LDB 512.

The engine controller 510 primarily controls the image forming process done in the printer unit 200 and is provided with a CPU, a ROM, a SRAM, a NV-RAM, the IPP 515, and input/output (I/O) control ASIC. The NV-RAM has both a SRAM section and an EEPROM section, and backs up the data in the SRAM section to the EEPROM section when power is down. The I/O ASIC has a serial interface with the CPU and controls various actuators (e.g., counters, fans, solenoids and motors) near the engine controller 510. The engine controller 510 and an I/O controller 20 are connected by a synchronous serial interface.

The I/O controller 20 is provided with a CPU 21 (Shown in FIG. 5) and detects a toner density on the photosensitive drums 201, a toner density in the developing unit 204, and sheet jams in a sheet path by sensors 516. Based on the detection results of the sensors 516, the I/O controller 20 controls various actuators (e.g., solenoids, clutches, motors, and high voltage PSU). Detailed description of the I/O controller 20 will be provided below.

A power supply unit (PSU) of the printing apparatus 1 includes a main PSU 29 and a supplemental PSU 32. Both the main PSU 29 and the supplemental PSU 32 are supplied AC power from an outlet 27 through a main switch 28. The PSU of the printing apparatus 1 also is provided with a load current detector 33 which detects a load current of 24V and a current indicator 64.

Figure 4:
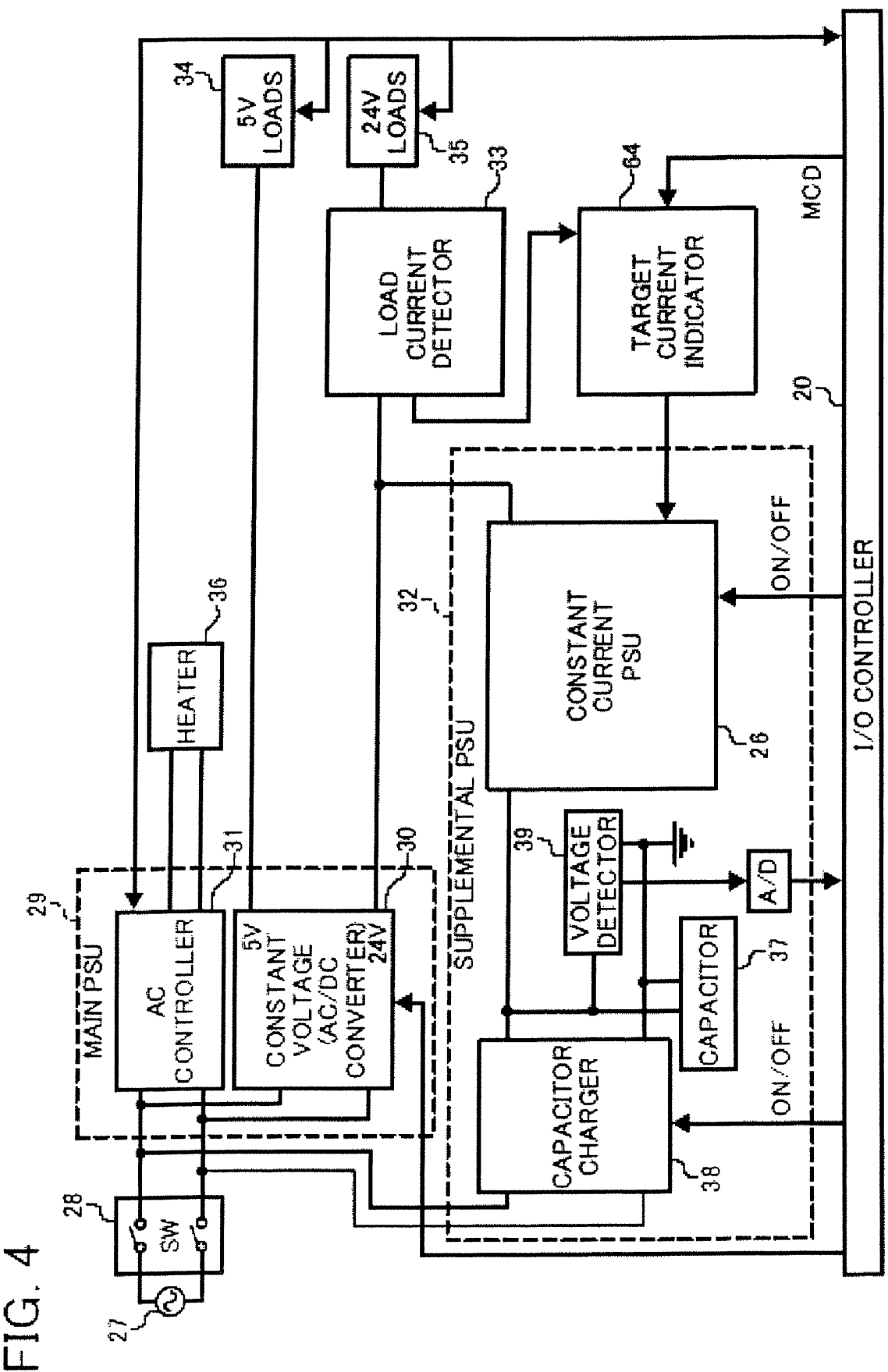
FIG. 4 is a block diagram illustrating a first power supply unit 30 and a second power supply unit 26 shown in FIG. 3 according to one embodiment of the invention.

FIG. 4 shows a detailed block diagram of the PSU. When the main switch 28 is turned on, the AC power from the outlet 27 is supplied to an AC controller 31 and an AC/DC converter (constant voltage PSU) 30 in the main PSU 29 and a capacitor charger 38 in the supplemental PSU 32. The AC controller 31 controls AC power to a heater 36 in the fusing unit 214 based on a command from the I/O controller 20 so that a temperature of the fusing unit 214 reaches a target temperature. The AC controller 31 detects the temperature of the fusing unit 214 and sends it to the I/O controller 20. The I/O controller 20 indicates one of three on-dutys of a thyristor in the AC controller 31 based on the temperature of the fusing unit 214. When the thyristor turns on based on the indicated on-duty, then the AC power from the outlet 27 is supplied to the heater 36.

The constant voltage PSU 30 in the main PSU 29 converts the AC voltage from the outlet 27 to a +24V DC voltage and a +5V DC voltage and supplies those voltages to +5V loads 34 and +24V loads 35, respectively. The +5V loads 34 can be electrical circuits such as the main controller 501. The I/O controller 20 and the +24V loads 35 can be actuators such as motors, clutches, and solenoids.

The supplemental PSU 32 is provided with a capacitor charger 38, a capacitor 37, a capacitor voltage detector 39, and a constant current PSU 26 which converts accumulated power in the capacitor 37 to a constant current +24V and supplies the constant current +24V to the +24V loads 35. The load current detector 33 detects an amount of current flowing through the +24V loads, which is a sum of currents concurrently supplied from both the constant voltage PSU 30 and the constant current PSU 26, and outputs the detected amount of current to the current indicator 64. The I/O controller 20 sends maximum current data (MCD), which reflects the maximum output current of the constant voltage PSU 30, to the current indicator 64. The current indicator 64 determines a target current output. The target current output is the difference between the maximum output current of the constant current PSU 30 and the detected amount of current from the current detector 33. The determined target current output is communicated to the constant current PSU 26. The constant current PSU 26 supplies the target constant current, which is produced from the accumulated power in the capacitor 37, to the +24V loads 35.

When the main switch 28 changes from an off-state, to an on-state then AC power is supplied from the outlet 27 to the AC controller 31 and the constant voltage PSU 30 and the capacitor charger 38 start to work. That is, the AC controller 31 starts to supply AC power to the heater 36, and the constant voltage PSU 30 starts to output +5V and +24V. At this time, if the temperature, of the fusing unit 214 is low and does not reach a fusing temperature then the I/O controller 20 sends a command to the AC controller 31 to supply increased power to the heater 36 in order to rapidly heat up the fusing unit 214. After the temperature of fusing unit 214 reaches the fusing temperature, the printing apparatus 1 enters a stand-by mode. In the stand-by mode, the power consumption of the printing apparatus 1 is reduced. In the stand-by mode, if a copy job or a print job is requested, the main controller 501 sends a copy or a print command to the engine controller 510 and the engine controller 510 initiates the job (goes into a print mode). In the print mode, the power consumption of the printing apparatus is increased. In the print mode, the I/O controller 20 controls the actuators based on the sensor's output and commands from the engine controller 510.

In this embodiment, the capacitor 37 in the supplemental PSU 32 includes electric double layer capacitor cells; however, any capacitors or rechargeable batteries can be used. Characteristics of the electric double layer capacitor are a fast charge/discharge time and a long life, both of which are very suitable for image forming use. Another characteristic of the electric double layer capacitor is that a voltage between two terminals of the capacitor (a capacitor voltage) decreases as the capacitor discharges. The constant current PSU 26 enables a required output current regardless of the capacitor voltage change.

Figure 5:
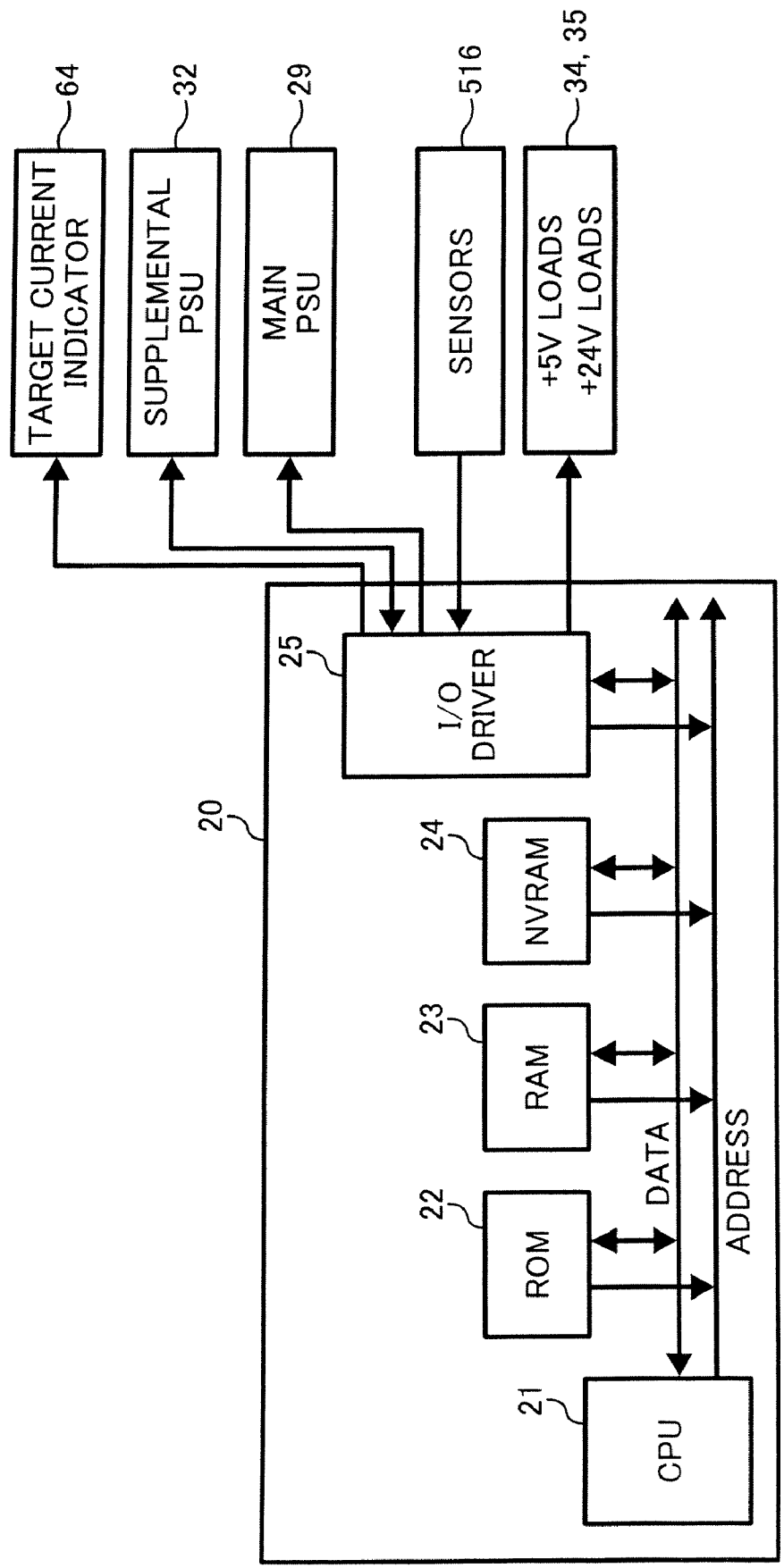
FIG. 5 is a detailed diagram of an Input/Output (I/O) controller 20 shown in FIG. 3 and FIG. 4.

FIG. 5 shows a block diagram of the I/O controller 20. The I/O controller 20 is provided with a CPU 21 which communicates with the engine controller 510, a ROM 22 which stores a program for the CPU 21, a RAM 23 which is used as a work area for the CPU 21, a NVRAM 24 which stores (a) on-off states of the loads 34 and 35, (b) a power consumption table in the print mode, and (c) a print time table, and an I/O driver 25 which detects states of the sensors 516 and others and drives the +24V loads 35, +5V loads 34, and others.

The I/O controller 20 receives commands from the engine controller 510 and controls each of the loads 34 and 35 sequentially in the print mode. The I/O controller 20 also controls a charging/discharging of the capacitor 37. During a power up sequence and a predetermined period after the power up sequence, the I/O controller 20 controls the supplemental PSU 32 to supply power for the +24V loads 35, and to increase the supply of AC power to the heater 36. In the stand-by mode, as the supply power to the heater 36 decreases and a total power consumption of the printing apparatus 1 decreases to lower than a rated power of the outlet 27, the I/O controller 20 controls the capacitor charger 38 to charge the capacitor 37.

Figure 6:
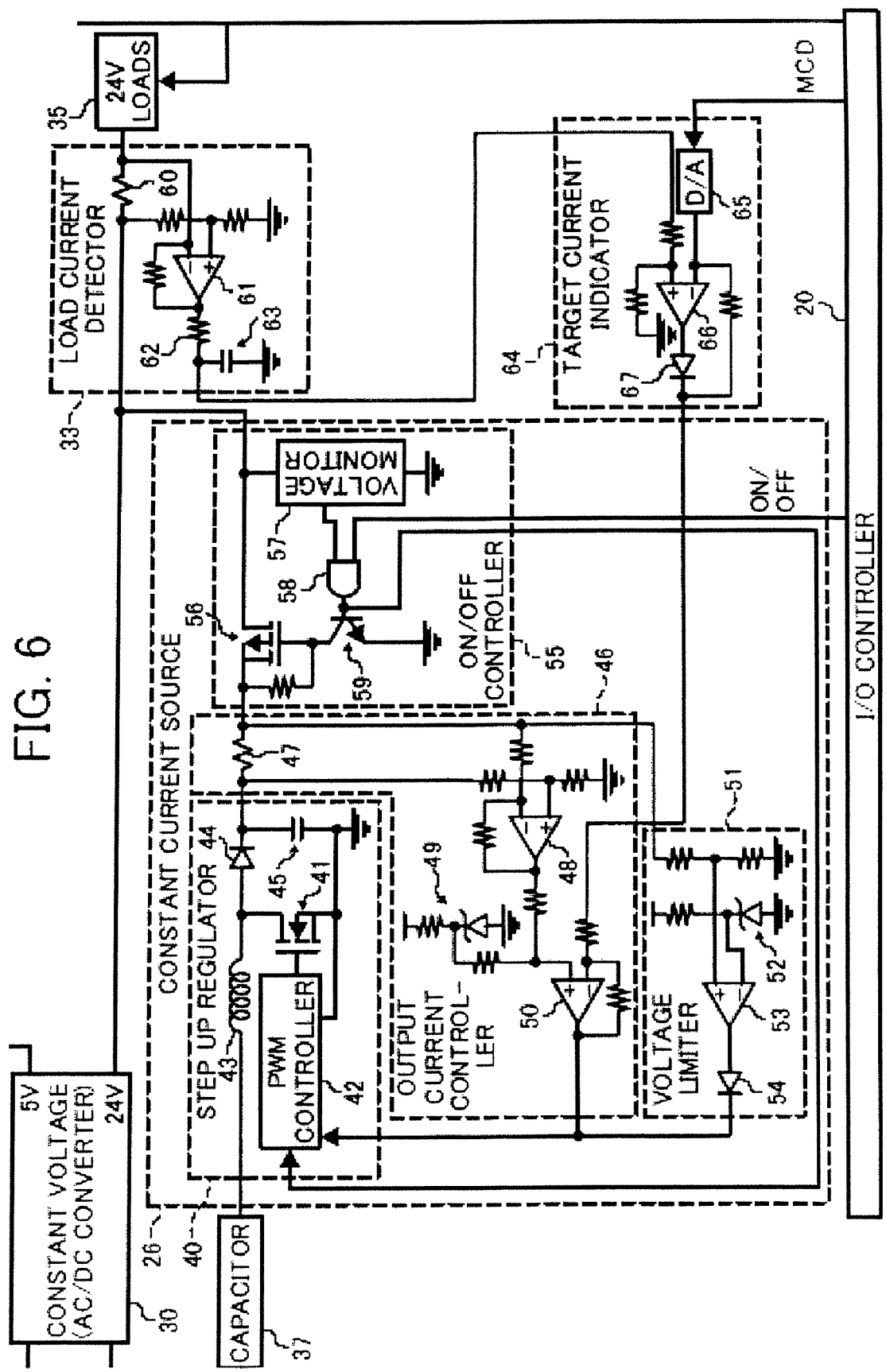
FIG. 6 is a circuit diagram of a second power supply unit 26, a load current detector 33 and a target current indicator 64.

FIG. 6 shows a detailed diagram of the constant current source 26, the load current detector 33, and the target current indicator 64. The electric double layer capacitor 37 has a relatively low rated voltage, which is 2.5V. So, to get a high voltage output, there needs to be a serial connection between capacitors. For example, to get more than a +24V output, more than 10 electric double layer capacitors need to be connected generally. Further, considering the output voltage decrease of the capacitor 37, more than 24 capacitors are necessary to get the +24V output. However, the required capacitance could be satisfied with the capacitance of five capacitors. So in this embodiment, a step up regulator 40 is provided to convert low output voltage from the capacitor 37 to +24V and to output constant current.

A switch 41 of the step up regulator 40 turns on when a PWM (Pulse Width Modulation) pulse from a PWM controller 42 is high and turns off when the PWM pulse is low. If the switch 41 turns on, then current flow starts from the capacitor 37 to both a reactor 43 and the switch 41. In this on-state, if the switch 41 turns off, then an output voltage of the reactor 43 increases and a capacitor 45 is charged with the output voltage of the reactor 43 through a diode 44. Accumulated voltage of the capacitor 45 increases gradually by repeatedly turning the switch 41 on and off. Moreover, the accumulated voltage of the capacitor 45 is supplied to the +24V loads 35 through a current detect resistor 47, a switch 56 of an on-off controller 55, and a load current detect resistor 60 of the load current detector 33.

Figure 7A:
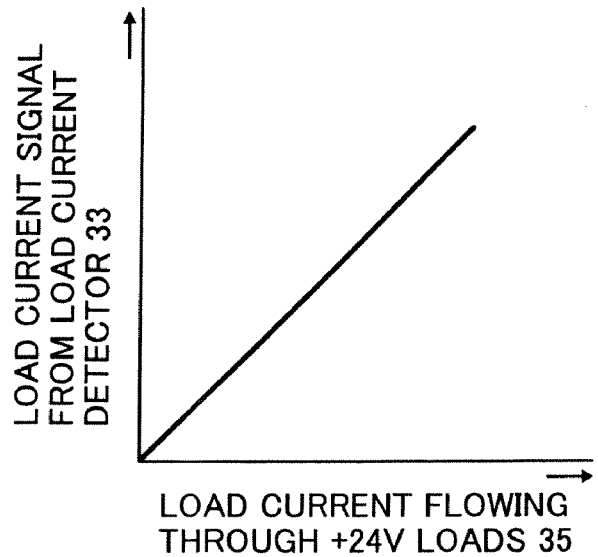
FIG. 7A is a chart illustrating a relationship between a load current flowing through +24V loads 35 and an output signal level of a load current detector 33 shown in FIG. 6.

The load current detector 33 outputs a load current signal (shown in FIG. 7A), which is generated by a differential amplifier 61, to the target current indicator 64 through a low pass filter including a resistor 62 and a capacitor 63. The differential amplifier 62 amplifies a voltage difference, which is changed by the load current, between both ends of the load current detect resistor 60. A time constant of the low pass filter is several times 10 ms which is required to absorb a large voltage difference caused by a rush current when the motors turn on.

Figure 7B:
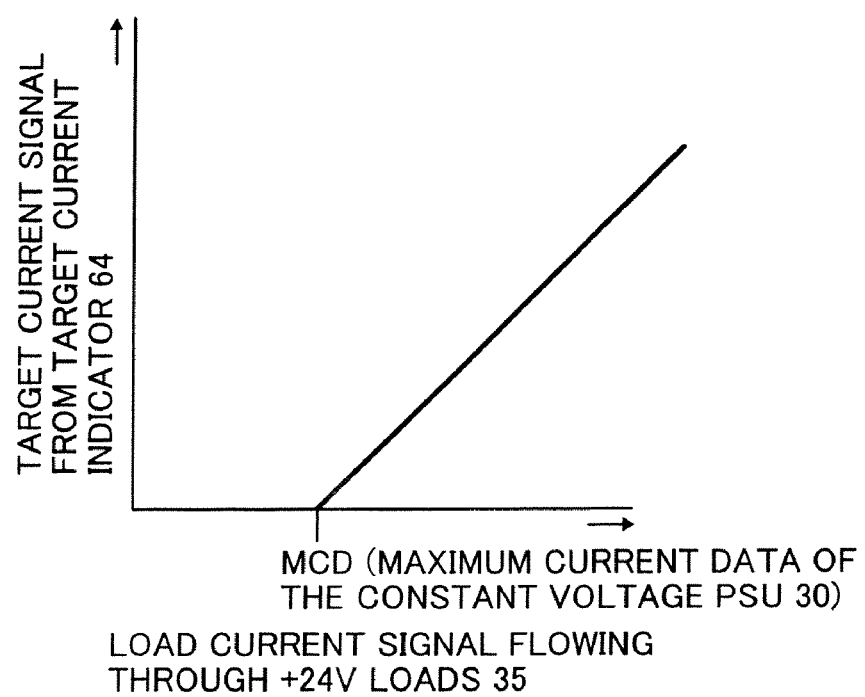
FIG. 7B is a chart illustrating a relationship between an output signal level of a load current detector 33 and a target current signal from a target signal indicator 64 shown in FIG. 6.

The target current indicator 64 outputs a target current signal (shown in FIG. 7B) which is generated by a differential amplifier 66 to an output current controller 46 of the constant current PSU 26 through a diode 67. The differential amplifier amplifies a difference between the load current signal from the load current detector 33 and an output signal of a digital-to-analog (D/A) converter 65 which converts a maximum current data (MCD) from the I/O controller to analog voltage data. The MCD indicates a maximum current outputted from the constant voltage PSU 30. The diode 67 intercepts the negative voltage from the differential amplifier 66. Based on the target current signal, the constant current PSU 26 supplies additional current to the +24V loads 35.

In the constant current PSU 26, a differential amplifier 48 amplifies a voltage difference between both ends of the current detect resistor 47 and outputs an output current signal. A bias circuit 49 biases the output current signal and the biased output current signal is supplied to a differential amplifier 50. The differential amplifier 50 subtracts the target current signal from the biased output current signal and outputs a difference signal as a feedback signal to the PWM controller 42.

The PWM controller 42 controls a duty of the PWM pulse which controls the state of switch 41 (on or off) based on the difference signal. For example, if the target current signal from the target current indicator 64 increases and the difference signal from the differential amplifier 50 decreases, then the PWM controller 42 increase the on-duty of the PWM pulse. As a result of increasing the on-duty of the PMW pulse, the output current of the step up regulator 40 increases. Conversely, an increase of the output current of the step up regulator 40 results in a larger current signal and that renders the difference signal larger. The larger difference signal decreases the on-duty of the PWM pulse and leads to a decrease of output current of the step up regulator 40. Based on these feedback controls resulting from a change of duty of the PWM signal explained above, the output current of the step up regulator 40 reaches a target current, which is a difference between the load current and the maximum current indicated by the MCD from the I/O controller 20 as indicated by the target current indicator 64.

Figure 7C:
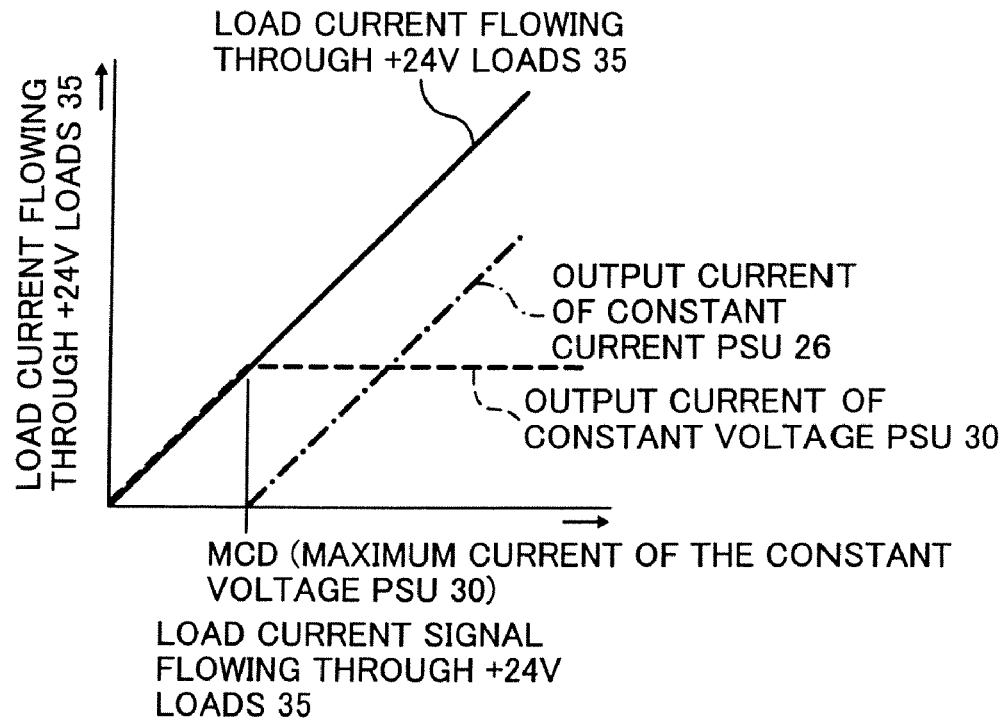
FIG. 7C is a chart illustrating a relationship between a load current flowing through +24V loads 35, an output current of a first power supply unit 30, and a output current of a second power supply unit 26.

FIG. 7C shows a relationship of the load current (shown as a solid line), the output current of the constant voltage PSU 30 (shown as a dotted line), and the output current of the constant current PSU 26 (shown as a dot-and-dash line).

The +24V loads can be of two types. The first type is a controllable type which is controlled by the I/O controller 20 or another controller. The second type is an uncontrollable type which is always in an on-state (e.g., a cooling fan). Therefore, even if the I/O controller 20 controls the controllable type loads to be in an off state, power is still provided to the uncontrollable loads. The step up regulator 40, shown in FIG. 6, is a boost type regulator. Consequently, even if the PWM controller 42 controls the switch 41 to always be in an off-state, the capacitor 37 could discharge in the case where the output voltage is lower than the input voltage of the step up regulator 40. For example, when the main switch 28 is in an off-state and the 24V supply from the constant voltage PSU 30 disappears, the power from the capacitor 37 is supplied to the uncontrollable loads and the accumulated power of the capacitor 37 discharges. To prevent this inconvenience, in this embodiment, the constant current PSU 26 is provided with the on-off controller 55.

As shown in FIG. 6, a voltage monitor 57 in the on-off controller 55 monitors the output voltage of the constant current PSU 26. If the output voltage of the constant current PSU 26 declines to a predetermined voltage (e.g., 22.8V), then the output signal of the voltage monitor 57 changes from a high level signal which reflects a normal state to a low level signal which reflects an abnormal state. As an on-off signal (high:on/low:off) from the I/O controller 20 and the output signal of the voltage monitor 57 are inputted to an AND-gate 58, if the output signal of the voltage monitor 57 is at a high level then the output signal of the AND-gate 58 also changes to a high level (the on-off signal is at a high level) and a transistor 59 changes to an on-state. However, if the output signal of the voltage monitor 57 changes to a low level then the transistor 59 changes to an off-state. Therefore, the switch 56 also changes to an off-state and the constant current PSU 26 stops supplying power to the +24V loads.

The output signal of the voltage monitor 57 is also provided to the PWM controller 42. If the output signal of the voltage monitor 57 is at a high level, then the PWM controller 42 controls the on-state/off-state of the switch 40. However, if the output signal of the voltage monitor 57 is at a low level, then the PWM controller 42 changes the switch 40 to the off-state. When the switch 40 is in the off-state, then the discharge of the capacitor 37 through the switch 40 is also stopped.

Figure 7D:
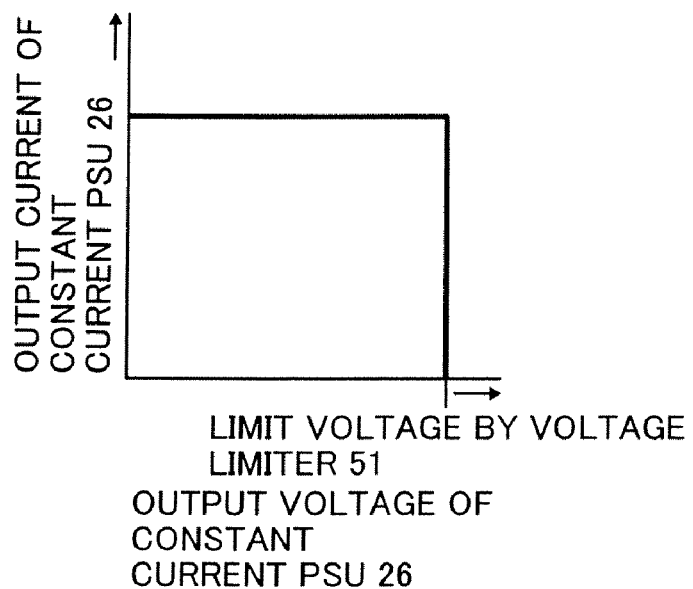
FIG. 7D is a chart illustrating a relationship between an output current and an output voltage of the second power supply unit 26.

A voltage limiter 51 including a zener diode 52, a comparator 53, and a diode 54 monitors the output voltage of the constant current PSU 26. If the output voltage exceeds a predetermined threshold voltage, which is determined by the zener diode 52, an output signal of the comparator 53 changes from a low level to a high level which indicates an abnormal status. The output signal of the comparator 53 is outputted through the diode 54 and when an abnormal status occurs, the high level output of the voltage limiter 51 makes the duty of the PWM signal from the PWM controller 42 zero. As a result, the switch 41 is in an off-state and the constant current PSU 26 stops supplying the power to the +24V loads (shown in FIG. 7D).

If the output voltage of the constant current PSU 26 becomes abnormally high, then the output current, which is detected by the voltage differential of the current detect resister 47, decreases. As a result, the PWM controller 42 tries to increase the output current and increases the high duty of the PWM signal that causes the further increase of the output voltage of the constant current PSU 26. The voltage limiter 51 prevents such an abnormal state.

The predetermined threshold voltage needs to be higher than a maximum normal output voltage of the constant voltage PSU 30, but also needs to be lower than a maximum rated voltage of the +24V loads. The normal output voltage of the constant voltage PSU is from (+24V+5%) to (+24V−4%). Therefore, the maximum normal output voltage of the constant voltage PSU 30 is +25.2V. While the maximum rated voltage of the +24V loads is +24V+10%, which is +26.4V. Accordingly, the predetermined threshold voltage needs to be from +25.2V to +26.4V.

A transition of the output current of the constant current PSU 26 is explained with reference to FIG. 8. In a warm-up period, which starts right after the main switch 28 is turned on and ends when the temperature of the fusing unit 214 reaches the fusing temperature, supplying power to the heater 36 increases relative to other periods and rapidly increases the temperature of the fusing unit 214 to the fusing temperature.

In the warm-up period, both the constant voltage PSU 30 and the constant current PSU 26 supply power to the +24V loads 35. As the constant current PSU 26 supplies the power to the +24V loads 35, the power consumption in the constant voltage PSU 30 decreases and the AC controller 31 can increase the AC power to the heater 36. Therefore, the temperature of the fusing unit 214 rapidly increases and the warm-up period can be shortened.

After the warm-up period, the AC power to the heater 36, which maintains the temperature of the fusing unit 214 at the fusing temperature, could be relatively small. However, when the copy job or the print job starts, then the power consumption of the +24V loads 35 increases. This is especially true when the motors starts and that could cause the power consumption to exceed the rated power of the outlet 27. To restrict the total power consumption of the printing apparatus 1 within the rated power of the outlet 27 (shown in FIG. 8(a)), the I/O controller 20 instructs the AC controller 31 to decrease the supplying power to the heater 36 (shown in FIG. 8(b)), then increases the power consumption in the constant voltage PSU 30 (shown in FIG. 8(c)). In other words, the I/O controller 20 sends the higher MCD to the target current indicator 64. By restricting the power consumption in the constant voltage PSU 30, the power consumption in the heater 36 (shown in FIG. 8(b)) plus the power consumption in the constant voltage PSU 30 (shown in FIG. 8(c)) becomes lower than the rated power of the outlet 27 (shown in FIG. 8(a)). Actual current consumption of the +24V loads 35 is shown in FIG. 8(d) and an output current from the constant voltage PSU 30 is shown in FIG. 8(e). The output current from the constant voltage PSU 30 is restricted by the MCD, so the constant current PSU 26 supplies an excess current which the constant voltage PSU 30 cannot supply to the +24V loads 35 (shown in FIG. 8(f)).

The I/O controller 20 sets the MCD, which changes the maximum output current from the constant voltage PSU 30, according to the state of the printing apparatus 1 and controls the output current (power) from the constant current PSU 26.

Figure 9A:
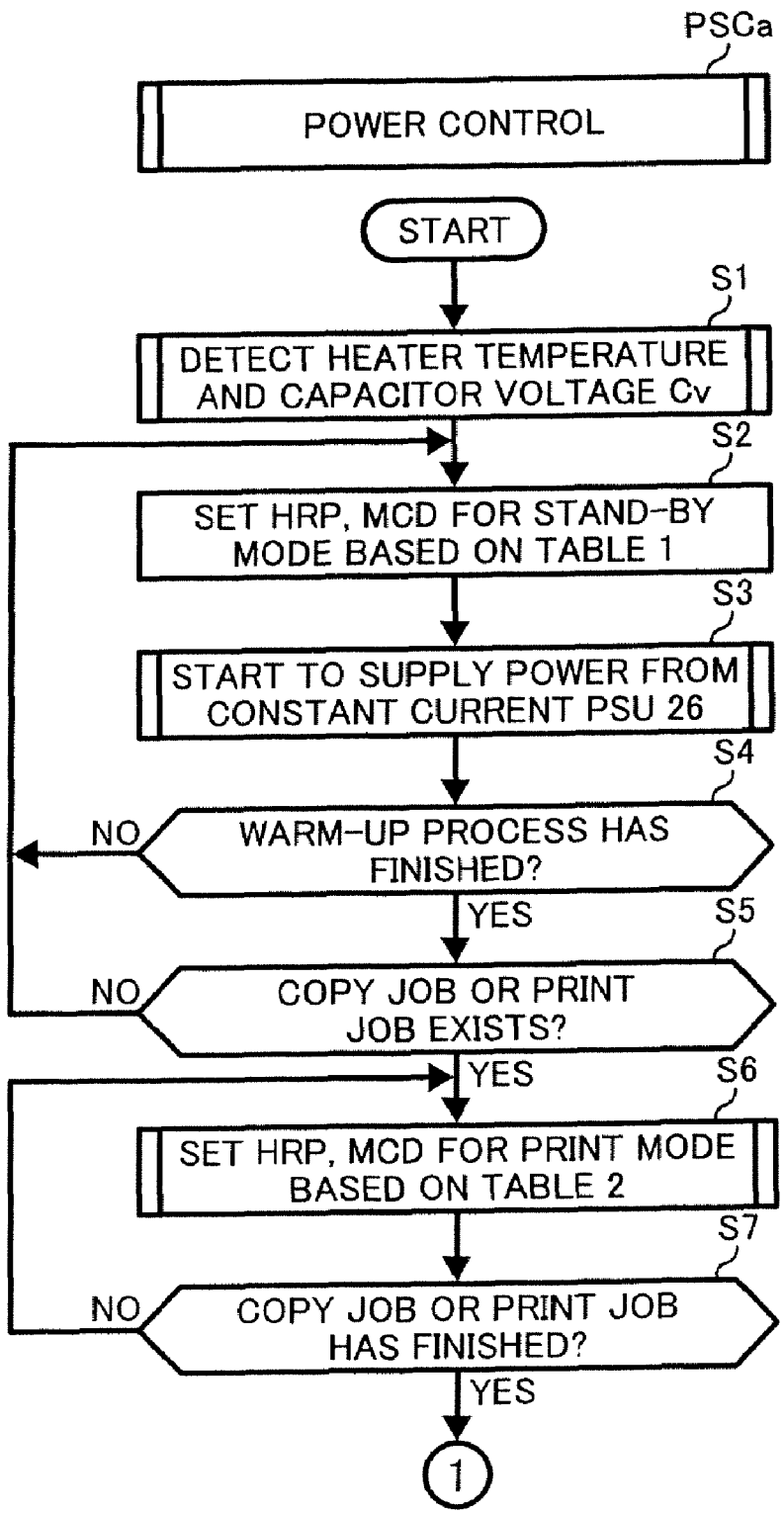
FIG. 9 is a flow chart of a power supply control performed by an Input/Output controller 20.
Figure 9B:
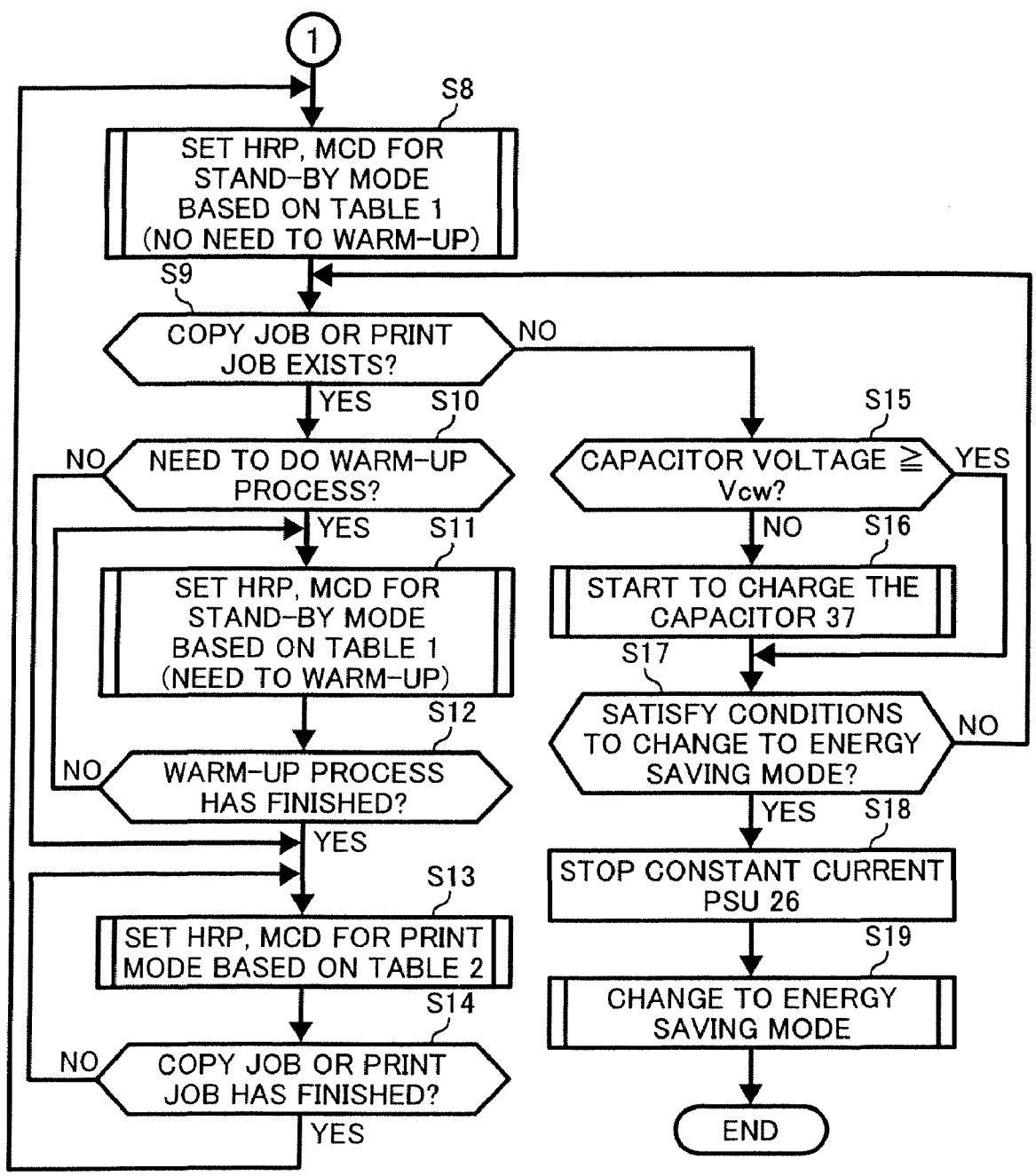

FIG. 9 is a flow chart of a power control method according to one embodiment of this invention. The method starts when the state of the main switch 28 changes from an off-state to an on-state or the state of the printing apparatus 1 changes from an energy saving mode to a stand-by mode under control of the I/O controller 20.

When the state of the main switch 28 changes from an off-state to an on-state or the state of the printing apparatus 1 changes from an energy saving mode to a stand-by mode, the I/O controller 20 receives the temperature of the fusing unit 214 and connects the capacitor voltage detector 39 to the capacitor 37 to detect the capacitor voltage. An output signal of the capacitor voltage detector is inputted to an A/D converter and the A/D converter outputs the voltage of the capacitor. The I/O controller 20 receives the voltage of the capacitor and disconnects the capacitor voltage detector 39 from the capacitor 37 to prevent discharge through the capacitor voltage detector 39 (Step S1).

Next, the I/O controller 20 determines a heater power (HRP) and the MCD based on a Table 1 (see below) and sends the HRP to the AC controller 31 and sends the MCD to the target current indicator 64 (Step S2). Then, the I/O controller 20 changes the on-off signal provided to the on-off controller 55 of the constant current PSU 26 to an on-state and starts the current supply from the constant current PSU 26 (Step 3). The AC controller 31 starts power control of the heater 36 based on the HRP and the constant current PSU 26 starts to supply the current, which exceeds the maximum output current of the constant voltage PSU indicated by the MCD, to the +24V loads.

Figure 10:
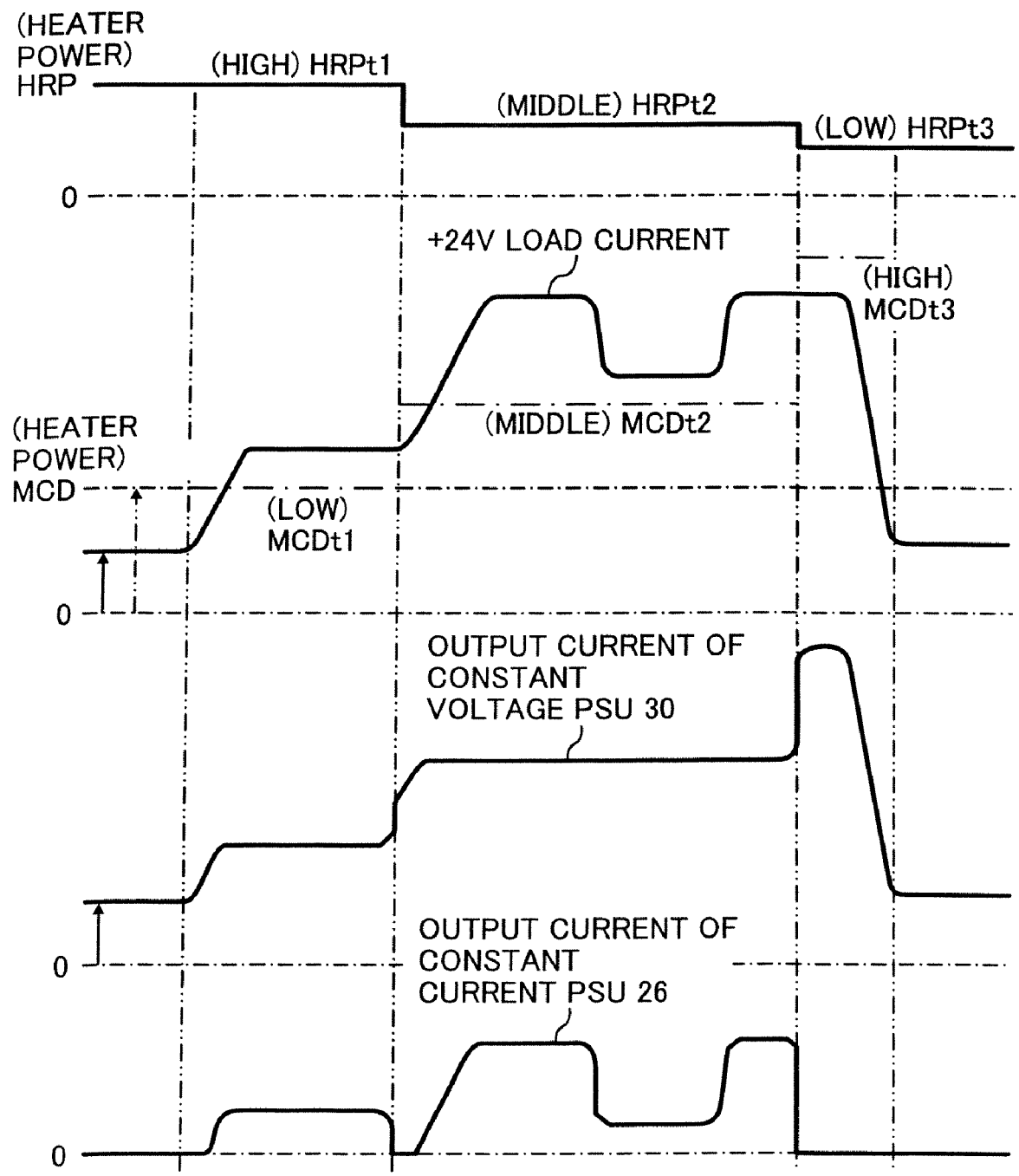
FIG. 10 is a timing chart illustrating a relation of a heater power (HRP), a maximum current data (MCD), a load current flowing through a +24V loads 35, an output current of a first power supply unit 30, and an output current of a second power supply unit 26.

In this embodiment, the HRP has three levels including HRPt1 (high), HRPt2 (middle) and HRPt3 (low), and the MCD has three levels including MCDt3 (high), MCDt2 (middle), and MCDt1 (low) shown in FIG. 10. The I/O controller 20 selects a combination of the HRP and the MCD based on a phase of the image forming process. During the high power consumption phase, the I/O controller 20 selects the combination of (HRPt1, MCDt1) or (HRPt2, MCDt2) and instructs the supplemental PSU 32 to support a portion of the power consumption of the printing apparatus 1 as shown in FIG. 10. By selecting the combination based on the phase of the image forming process, the printing apparatus 1 can perform the image forming process without exceeding the rated power of the outlet 27, but with much more power than the rated power of the outlet 27 in a short period.

The HRP and the MCD are stored in the NVRAM 24 of the I/O controller 20. Combinations of the HRP and the MCD are stored as a table corresponding to the mode of the printing apparatus. Table 1 shows combinations of the HRP and the MCD for the stand-by mode, and Table 2 shows combinations of the HRP and the MCD for the print mode.

The HRP and the MCD for the stand-by mode (Table 1) are decided based on a capacitor voltage Cv and whether a warm-up process is needed. Specifically, if the capacitor voltage is greater than Cv (i.e., high enough) to supply power to the +24V loads, then the MCD is set to low (MCDt1) to easily supply ample current. If the capacitor voltage is lower than Cv, then the MCD is set to its highest level (MCDt3).

TABLE 1

Table 1: the heater power (HRP) and the maximum current date (MCD) of the constant voltage PSU for the Stand-by mode
STAND-BY Mode

|  | Warm-up Process is needed | Warm-up process is not needed |
|---|---|---|
| Cv > Vcs | HRP: HIGH (HRPt1) | HRP: LOW (HRPt3) |
|  | MCD: LOW (MCDt1) | MCD: HIGH (MCDt3) |
| Cv ≦ Vcs__ | HRP: HIGH (HRPt2) | HRP: LOW (HRPt3) |
|  | MCD: LOW (MCDt3) | MCD: HIGH (MCDt3) |

Cv: Capacitor Voltage
HRP: Heater Power
Vcs: Discharge Stop Voltage
MCD: Maximum Current Date

TABLE 2

Table 2: the heater power (HRP) and the maximum current data (MCD) of the constant voltage PSU for the Print Mode
Print Mode

|  | Necessary Power: Large | Necessary Power: Middle |
|---|---|---|
| Cv > Vcs | HRP: MIDDLE (HRPt2) | HRP: LOW (HRPt3) |
|  | MCD: MIDDLE (MCDt2) | MCD: HIGH (MCDt3) |
| Cv ≦ Vcs__ | HRP: LOW (HRPt3) | HRP: LOW (HRPt3) |
|  | MCD: HIGH (MCDt3) | MCD: HIGH (MCDt3) |

Cv: Capacitor Voltage
HRP: Heater Power
Vcs: Discharge Stop Voltage
MCD: Maximum Current Date If the capacitor voltage is lower than a Vcs, which is a discharge stop voltage, then the MCD is set to the highest (MCDt3) level. In that situation, the current supply from the constant current PSU 26 is stopped, and all load current is supplied with the constant voltage PSU 30. The output voltage of the constant current PSU 26 is approximately +24V and constant. If the capacitor voltage decreases, then an input current of the step up regulator 40 increases to maintain the same amount of output current from the constant current PSU 26. In order to tolerate for a large input current, an expense of the step up regulator 40 increases and it is impossible to tolerate a huge input current. Considering these conditions, in this embodiment, the discharge stop voltage Vcs is determined to be a half of the maximum capacitor voltage.

If the warm-up process is needed, then the HRP is set to high (HRPt1). Conversely, if the warm-up is not needed, then the HRP is set to low (HRPt3). In the stand-by mode, without the need of the warm-up process, the printing apparatus 1 does not adjust an image forming condition and the power consumption by the +24V loads is small. In a warm-up period where the printing apparatus changes from the stand-by mode to the print mode, the fusing unit 214 needs to be heated rapidly, and the power consumption by the +24V loads is relatively high. Therefore, the MCD is set to low to increase the power supply from the constant current PSU 26 and to supply greater power to the heater 36.

The HRP and the MCD for the print mode (Table 2) are decided based on the capacitor voltage Cv and whether a power of the fusing unit 214 needed after the warm-up period is high or moderate.

With reference again to the Step S2 in FIG. 9, the I/O controller 20 determines if the warm-up process is required or not based on the temperature of the fusing unit 214, and also determines whether the capacitor voltage Cv is higher than the discharge stop voltage Vcs. Based on the results, the I/O controller 20 selects the HRP and the MCD and sends the HRP to the AC controller 31 and the MCD to the A/D converter 65 of the target current indicator 64. In the Step S3, the I/O controller 20 changes the on-off signal to the on-off controller 55 of the constant current PSU 26 to high (i.e., on), and the step up regulator 40 starts to convert the accumulated DC power of the capacitor 37 to +24V DC power.

If the temperature of the fusing unit 214 reaches the fusing temperature (Step 4:YES), then the I/O controller 20 determines if the operator requires the copy job or the print job (Step S5).

If the copy job or the print job is required, then the I/O controller 20 changes the HRP and the MCD based on the Table 2 (Step S6). The I/O controller 20 selects the HRP and the MCD (see the column titled "necessary power large" of Table 2) based on the capacitor voltage Cv and sends them to the AC controller 31 and the target current indicator 64. Right after the printing process starts, a roller of the fusing unit 214 is sufficiently hot to fix the toner on the recording sheet, but the fusing unit 214 and other mechanical parts around the fusing unit 214 are not sufficiently hot. So in the beginning of the print mode, the temperature of the fusing unit 214 easily declines. To prevent the temperature drop, the I/O controller 20 controls a supply of large AC power to the heater 36. After continuing the print process, the fusing unit 214 and other mechanical parts become sufficiently hot, so the I/O controller 20 selects the HRP and the MCD (see the column titled "necessary power middle" of Table 2) based on the capacitor voltage Cv and sends them to the AC controller 31 and the target current indicator 64.

After the copy job or the print job finishes (Step S7), the I/O controller 20 selects the HRP and the MCD (see the column titled "no need to warm-up" of Table 1) based on the capacitor voltage Cv and sends them to the AC controller 31 and the target current indicator 64 (Step S8), then waits for another copy job or another print job (Step S9).

When the copy job or the print job comes in (Step S9:YES), then the I/O controller 20 determines whether the warm-up process is needed (Step S1). If the warm-up is needed (Step S10:YES), then the I/O controller sends the HRP and the MCD (see the column titled "need to warm-up" in Table 1) to the AC controller 31 and the target current indicator 64 (Step S11). The I/O controller 20 determines whether the warm-up process has finished or not based on the temperature of the fusing unit 214 (Step S112), and if the warm-up process has finished, then sends the HRP and the MCD (See Table 2) to the AC controller 31 and the target current indicator 64 (Step S13) until the copy job or the print job finishes (Step S14).

At the Step S9, if a copy or print job is not requested (Step S9:No), then the I/O controller 20 detects the capacitor voltage Cv and determines whether the capacitor 37 needs to be charged or not (Step S15). If the capacitor voltage is less than a capacitor charge voltage (Vcw) and the capacitor 37 needs to be charged, then the I/O controller 20 controls the capacitor charger 38 and starts to charge the capacitor 37 (Step S16). If the stand-by mode continues a predetermined time and if the capacitor 37 does not need to be charged (Step S17:Yes), then the I/O controller 20 makes the signal to the on-off controller 55 of the constant current PSU 26 low (i.e., off), and stops the current supply from the constant current PSU 26 (Step S18). After stopping the constant current PSU 26, then the printing apparatus goes to an energy saving mode (Step S119). If the capacitor 37 needs to be charged when the predetermined time has passed (Step S17:No), then the step up regulator 40 continues to charge the capacitor 37 until the capacitor is fully charged. After finishing charging the capacitor 37, the printing apparatus 1 enters the energy saving mode. When the printing apparatus 1 enters the energy saving mode, the I/O controller 20 stops supplying AC power to the AC controller 31 and stops supplying the DC power to the +24V loads 35. Furthermore, power supply to the I/O controller 20 is also stopped and only the main controller 501 and a watching circuit (not shown), which detects when an operator accesses the image forming machine, are supplied power from an energy saving PSU (not shown). When the watching circuit detects the operator's access, then the printing apparatus 1 turns on and the I/O controller 20 starts the power control shown in FIG. 9.

According to one embodiment, the HRPt1, which is set during the warm-up period, is 1300 (W), the HRPt2, which is set in the print mode right after the warm-up period, is 1200 (W), and the HRPt3, which is set in the print mode after the fusing unit 214 becomes fully hot, is 900 (W). For the MCD, which determines the output current of the constant voltage PSU 30, when the HRP becomes high (HRPt1), then the MCD becomes low (MCDt1=200W) and increases the power supply from the constant current PSU 26. When the HRP is set to HRPt2, then the MCD can be selected from the MCDt1 and the MCDt2 (=300W), but not MCDt30 (=600W). When the HRP is set to the HRPt3, then the MCD can be selected from any of the MCDts. The total power consumption of the printing apparatus 1 should be less than the rated power of the outlet 27 which is 1500 (W). If the capacitor voltage Cv is less than the discharge stop voltage Vcs, then the MCD is set to the MCDt3 unconditionally, and only the constant voltage PSU 30 supplies voltage to the +24V loads 35.

Figure 11:
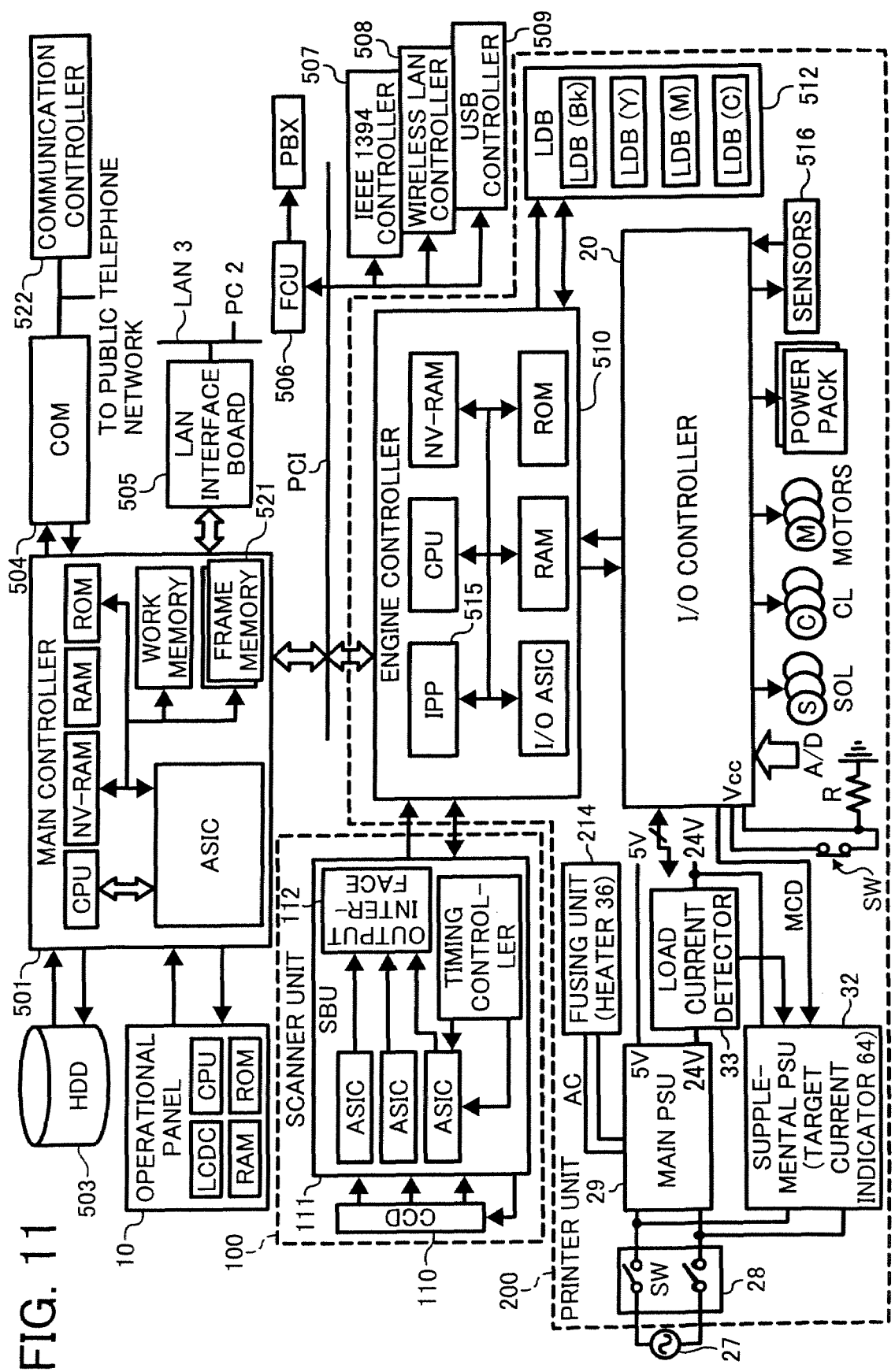
FIG. 11 is a block diagram illustrating main electrical parts of a printing apparatus 1 in another embodiment of the invention.

FIG. 11 shows another embodiment of the constant current PSU 26. In this embodiment, the target current indicator 64 (shown in FIG. 3) is in the constant current PSU 26, and the output signal of the load current detector 33 and the MCD from the I/O controller 20 are directly sent to the constant current PSU 26. Another difference is the load current detector 33 detects only the output current from the constant voltage PSU 29. Except for these points, the two embodiments have same structure.

Figure 12:
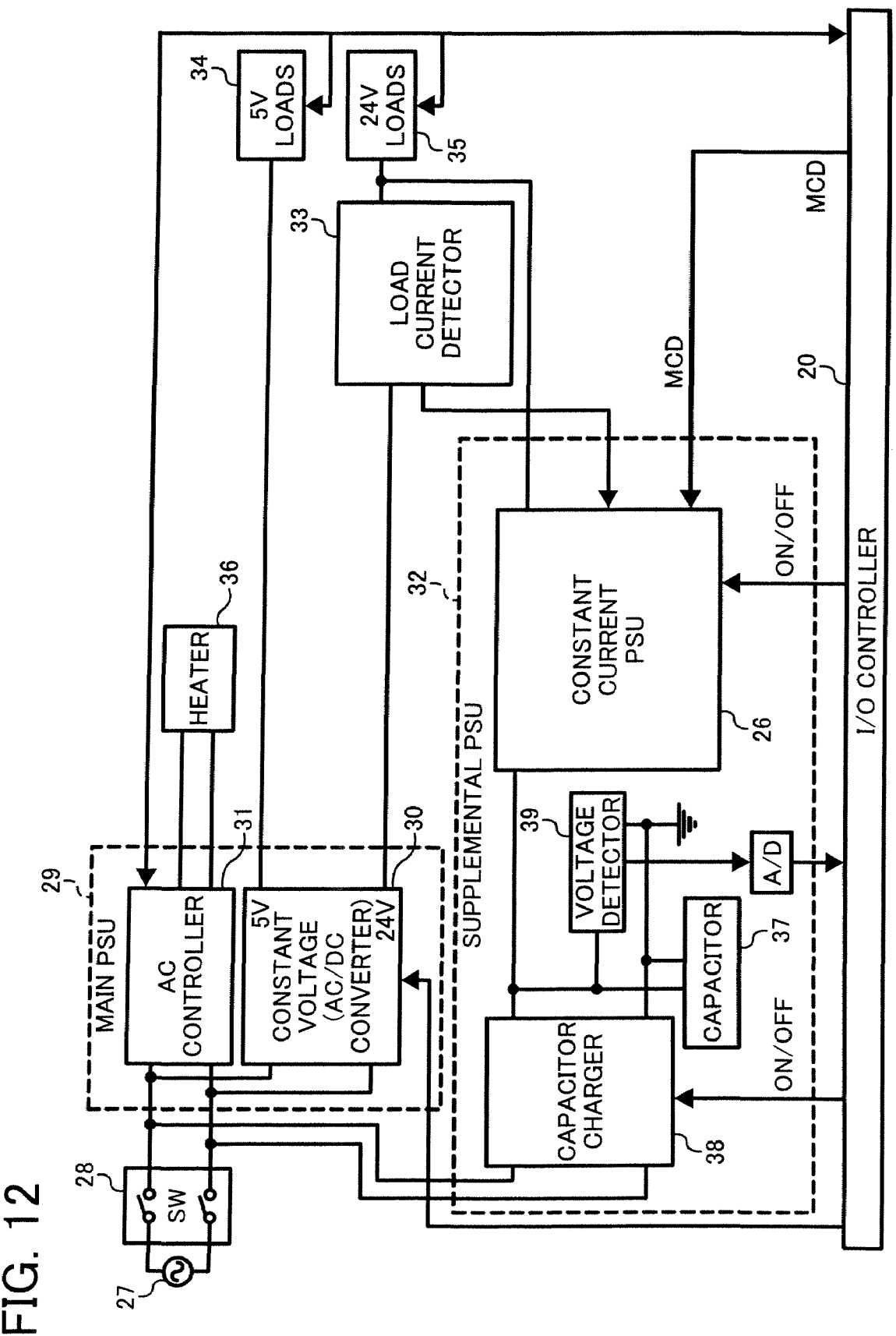
FIG. 12 is a block diagram illustrating a first power supply unit 30 and a second power supply unit 26 shown in FIG. 11.

FIG. 12 shows a detailed block diagram of the PSU and also shows the above-described differences between the previous embodiment and this embodiment. The load current detector 33 detects the output current of the constant voltage PSU 30 and sends a result to the output current controller 46 (shown in FIG. 14). The I/O controller 20 also sets the maximum output current to the output current controller 46, and the constant current PSU 26 outputs the current to the +24V loads 35 in order that the output current of the constant voltage PSU 30 reaches the maximum output current set by the I/O controller 20.

Figure 13:
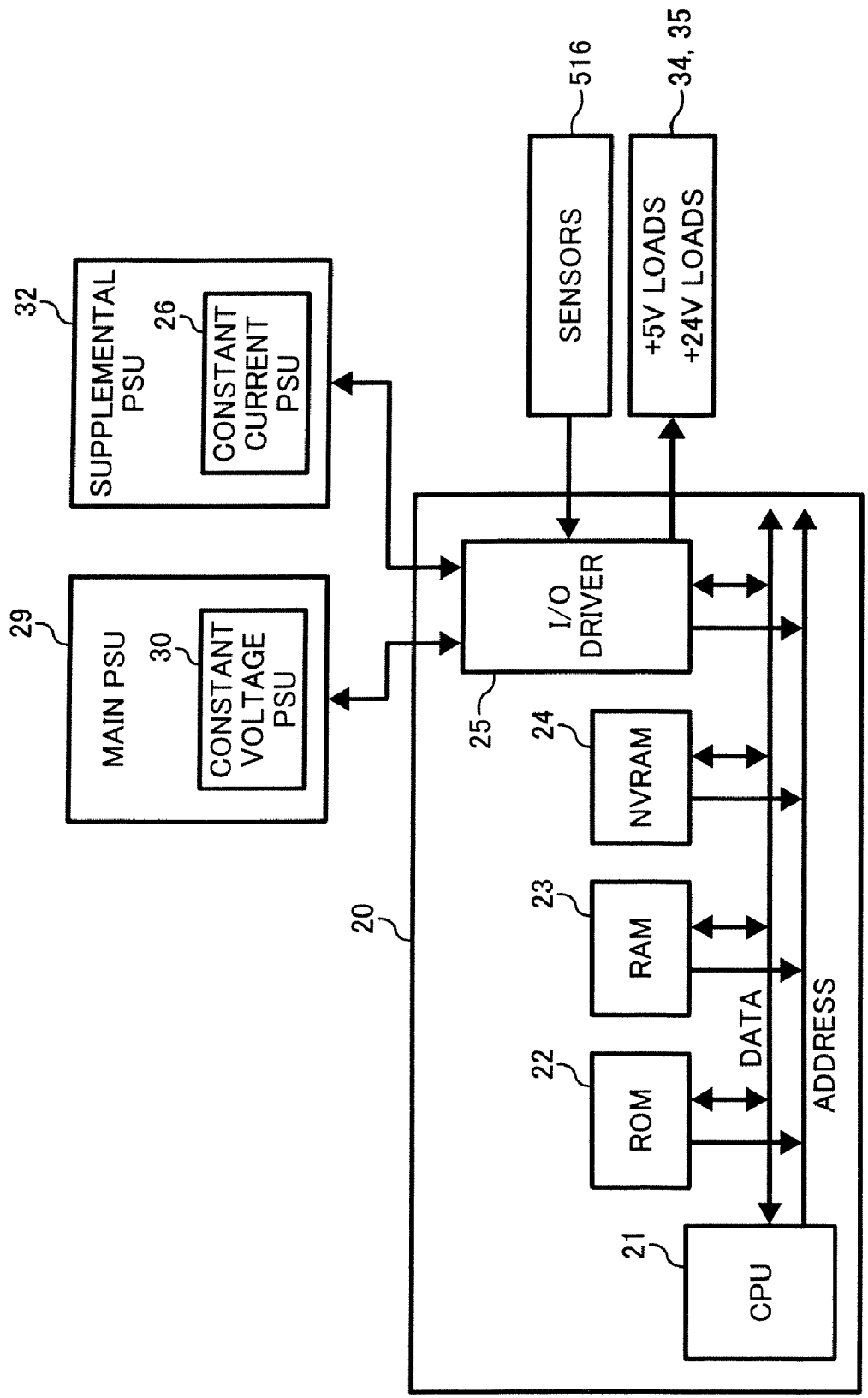
FIG. 13 is a detailed diagram of an Input/Output (I/O) controller 20 shown in FIG. 11 and FIG. 12.

FIG. 13 shows a block diagram of the I/O controller 20. In contrast to FIG. 5, in this embodiment, the I/O controller 20 sends the MCD to the constant current PSU 26 of the supplemental PSU 32. That is the only difference between the embodiments illustrated in FIGS. 5 and 13.

Figure 14:
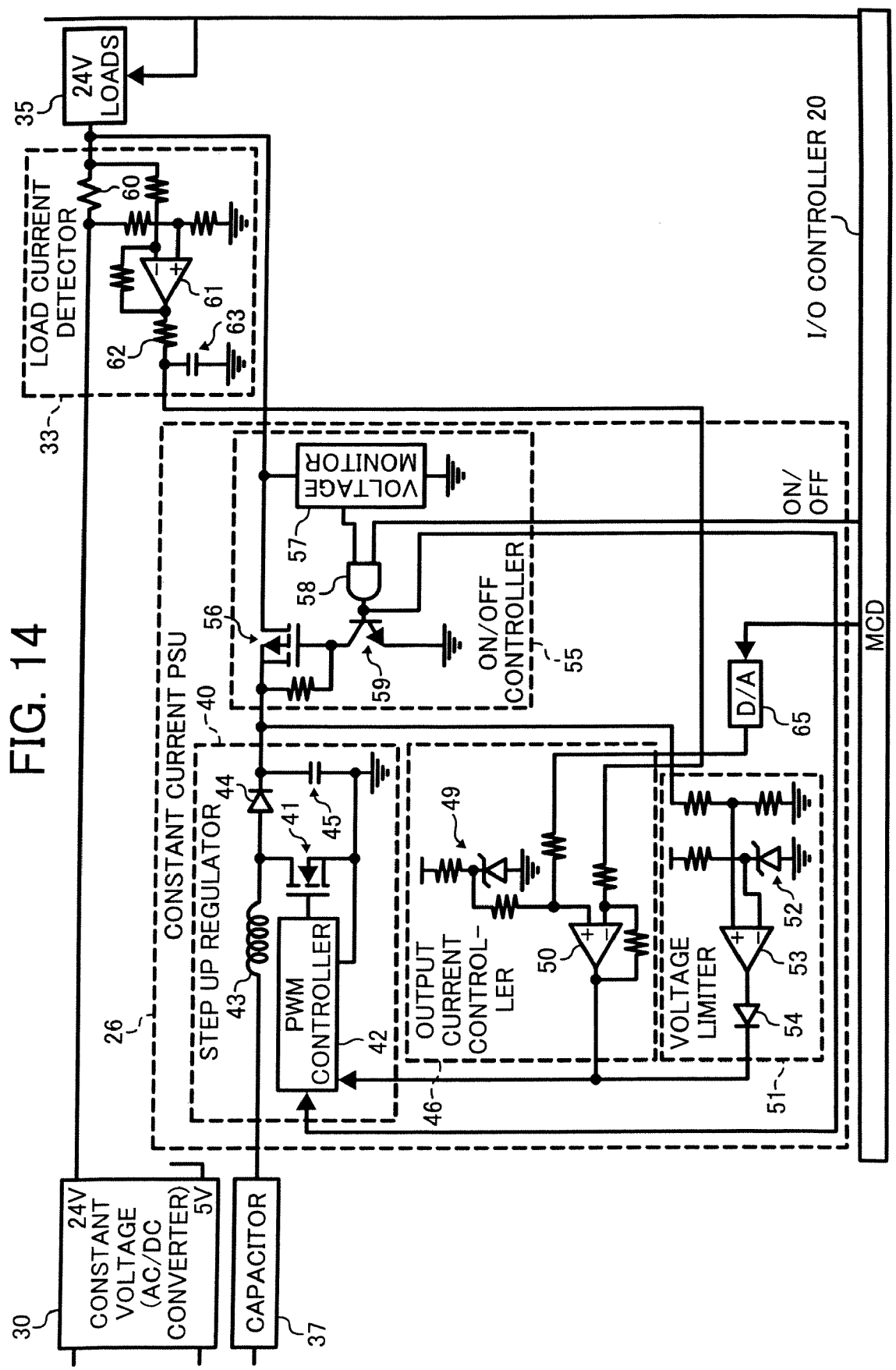
FIG. 14 is a circuit diagram of a second power supply unit 26, a load current detector 33 and a target current indicator 64 shown in FIG. 12.
Figure 15A:
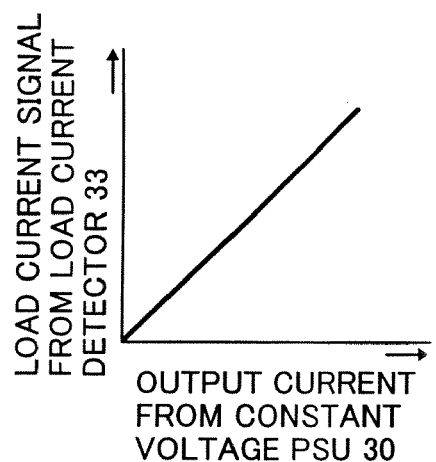
FIG. 15A is a chart illustrating a relationship between a load current and an output signal level of a load current detector 33 shown in FIG. 14.
Figure 15B:
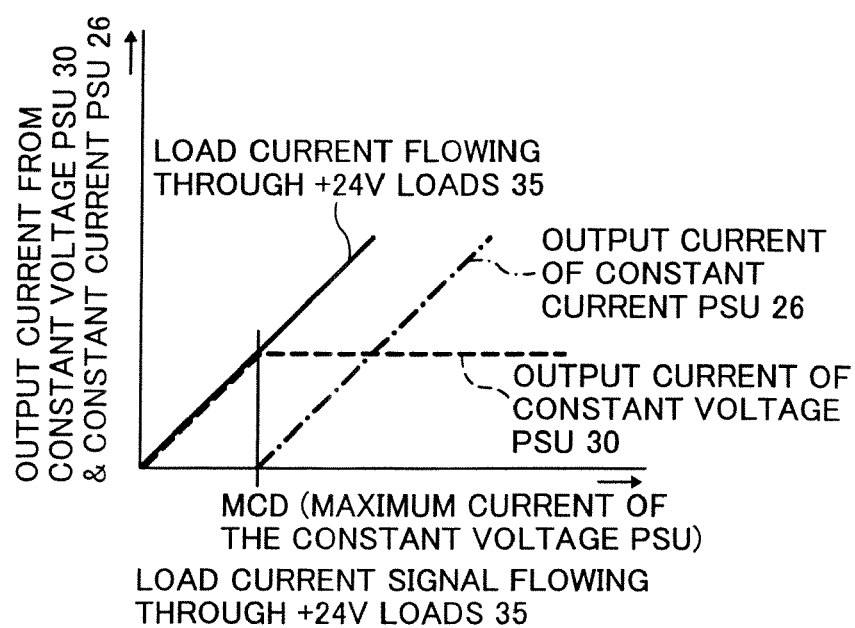
FIG. 15B is a chart illustrating a relationship between a load current, an output current of a first power supply unit 30, and a output current of a second power supply unit 26.

FIG. 14 is a circuit diagram of a constant current PSU 26. In this embodiment, the constant current PSU 26 is provided with a digital-to-analog converter (DAC) 65 and the I/O controller 20 sends the MCD to the DAC 65 instead of the target current indicator 64. The DAC 65 converts the MCD to a target current signal and sends the target current signal to the output current controller 46. The load current detector 33 only detects the output current from the constant voltage PSU 30 (FIG. 15A) and sends a detected current signal to the output current controller 46. The output current controller 46 detects the difference between the target current signal and the detected current signal, and outputs the difference signal to the PWM controller 42. The PWM controller 42 controls the duty of the PWM signal to the switch 41 and controls the output current from the constant current PSU 26 to equalize the detected current signal with the target current signal. The output current from the constant current PSU 26 is added to the output current from the constant voltage PSU 30 and the total current thereof satisfies the load current required by the +24V loads 35 (FIG. 15B).

Figure 15C:
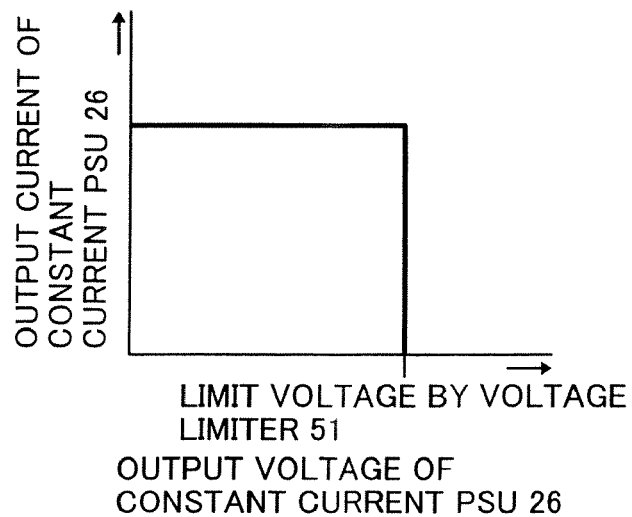
FIG. 15C is a chart illustrating a relationship between an output current and an output voltage of the second power supply unit 26.

The voltage limiter 51 monitors the output voltage of the constant current PSU 26. If the output voltage exceeds a predetermined threshold voltage, then the voltage limiter 51 detects the abnormality of the output of the constant current PSU 26 and stops supplying power to the +24V loads from the constant current PSU 26 (shown in FIG. 15C).

In this embodiment, the power control achieved by setting the HRP and the MCD is the same as the power control achieved with previous embodiment (shown in FIG. 9). The only difference is the target device to which the MCD is set; thus, further detailed explanation has been omitted.

Figure 16:
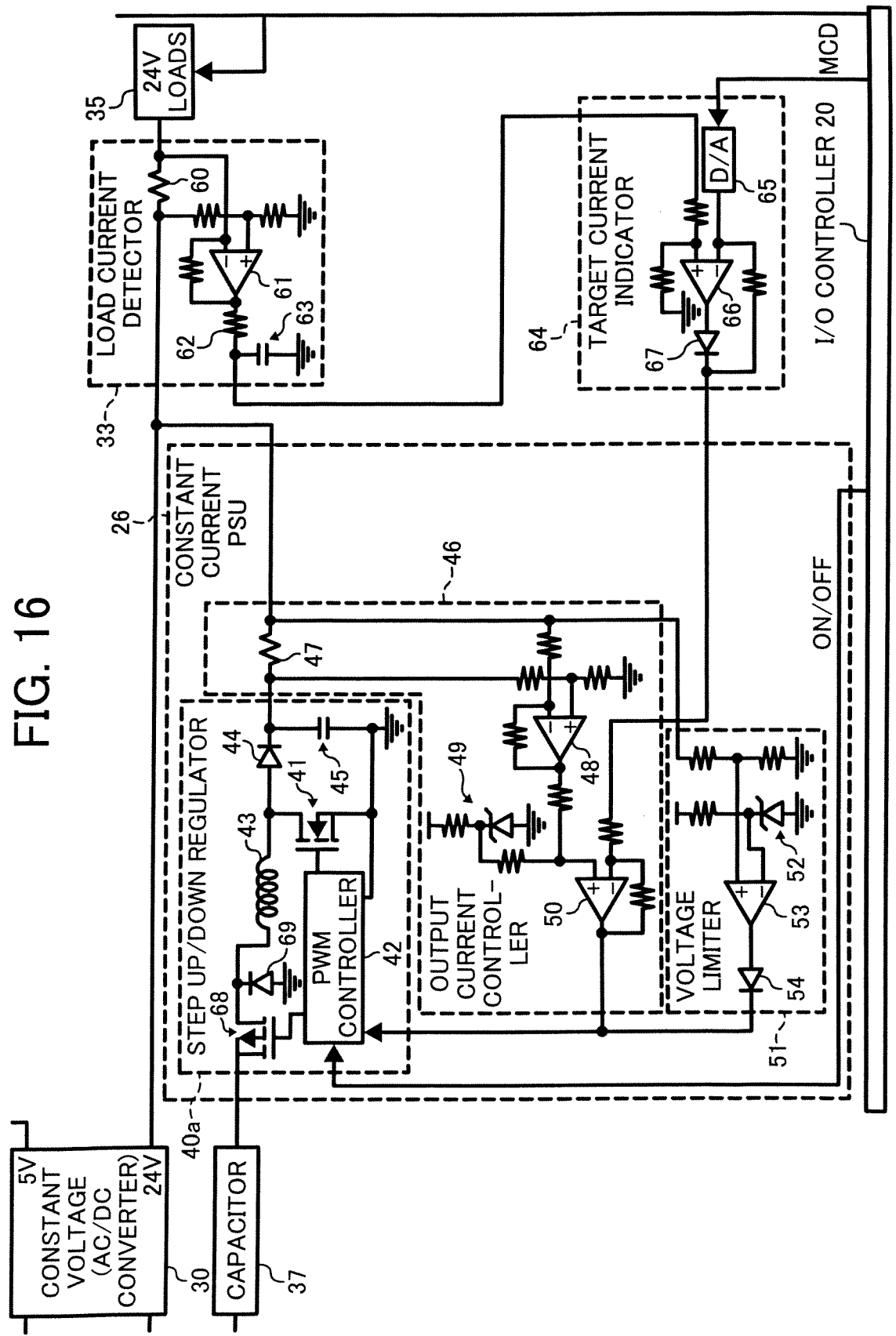
FIG. 16 is a circuit diagram of a second power supply unit 26 in another embodiment of the invention.

FIG. 16 shows another embodiment of the constant current PSU 26. In this embodiment, the step up regulator 40 in FIG. 6 is replaced with a step up/down regulator 40a and the on-off controller 55 is removed. However, the other structures are the same. Consequently, the descriptions provided above for previously described structure are abbreviated here. In this embodiment, the discharge stop voltage Vcs is also set to half of the maximum capacitor voltage. In order to use accumulated power in the capacitor 37 more efficiently, the Vcs needs to be set lower. Accordingly, right before the discharge stops from the capacitor 37, the capacitor voltage Cv is approximately a half of the maximum capacitor voltage and an input current to the constant current PSU 26 becomes twice as large compared to the input current when the capacitor voltage is maximum. If the output current of the constant current PSU is designed to be large, then the capacitor voltage right before the discharge stops is required not to be too low. This is achieved, for example, by connecting a plurality of the electric double layer capacitor cells serially. As one electric double layer capacitor cell can be charged to 2.5V, if ten to nineteen electric double layer capacitor cells are connected serially to supply +24V, then the maximum capacitor voltage is higher than +24V and the discharge stop voltage Vcs is lower than +24V. In this case, the step up/down regulator 40*a* is required to supply +24V.

The step up/down regulator 40*a* is provided with the switch 41 for a step up output, which is same as the previous embodiment, and a switch 68 for a step down output, which is located between the capacitor 37 and the reactor 43. The switch 68 is different from the previous embodiment. The switch 41 is turned on when a high voltage is given to a gate terminal and the switch 68 turns on when a low voltage is given to the gate terminal. When the differential signal from the differential amplifier 50 becomes lower, the PWM controller 42 makes the duty of the PWM pulse low and makes an on-state duty of the switch 68 higher. Unless the on-state duty of the switch 68 becomes 100%, the PWM controller 42 makes the on-state duty of the switch 41 0%. After the on-state duty of the switch 68 becomes 100%, then the PWM controller 42 makes the on-state duty of the switch 41 gradually increase. Conversely, when the differential signal from the differential amplifier 50 becomes higher, the PWM controller 42 makes the on-state duty of the switch 41 lower. Unless the on-state duty of the switch 41 becomes 0%, the PWM controller 42 makes the on-state duty of the switch 68 100%. After the on-state duty of the switch 41 becomes 0%, then the PWM controller 42 makes the on-state duty of the switch 68 gradually decrease.

In this embodiment, when the capacitor voltage Cv is higher than +24V, then the switch 41 is turned off and the switch 68 turns on and off in response to the PWM pulse from the PWM controller 42. Thus, the output voltage of the step up/down regulator 40*a* becomes +24V. When the capacitor voltage Cv is between +24V and the Vcs, then the switch 68 is maintained on and the switch 41 turns on and off in response to the PWM pulse from the PWM controller 42 like the previous embodiment. Thus, the output voltage of the step up/down regulator 40*a* becomes +24V.

Figure 17:
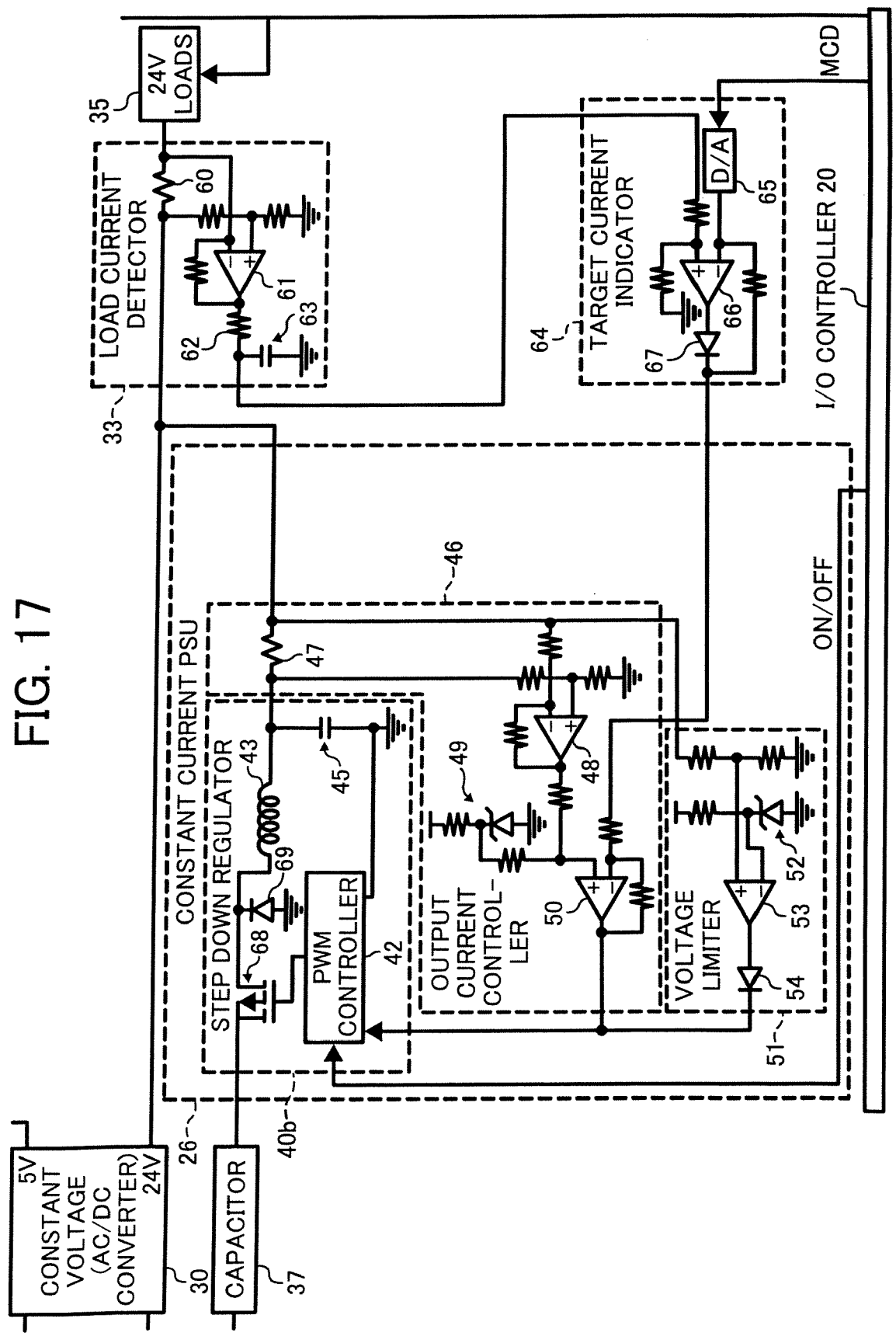
FIG. 17 is a circuit diagram of a second power supply unit 26 in another embodiment of the invention.

FIG. 17 shows another embodiment of the constant current PSU 26. In this embodiment, the step up regulator 40 in FIG. 6 is replaced with a step down regulator 40*b* and the on-off controller 55 is removed. However, the other structures are the same. Consequently, the descriptions of the other structures are abbreviated here. In this embodiment, the capacitor 37 of the supplemental PSU 32 is provided with a plurality of electric double layer capacitor cells serially connected and the discharge stop voltage becomes higher than +24V (e.g., +25V). In this case, the capacitor voltage needs to be stepped down. Thus, the step down regulator 40*b* is used in this embodiment.

The step down regulator 40*b* is provided with the switch 68 between the capacitor 37 and the reactor 43. The switch 68 turns on when a low voltage is given to a gate terminal. While an on-off signal from the I/O controller 20 indicates on, the PWM controller 42 controls the on-state duty of the switch 68 with the PWM pulse which is controlled based on the difference signal from the differential amplifier 50 and keeps the output voltage of the constant current PSU 26 +24V.

Figure 18:
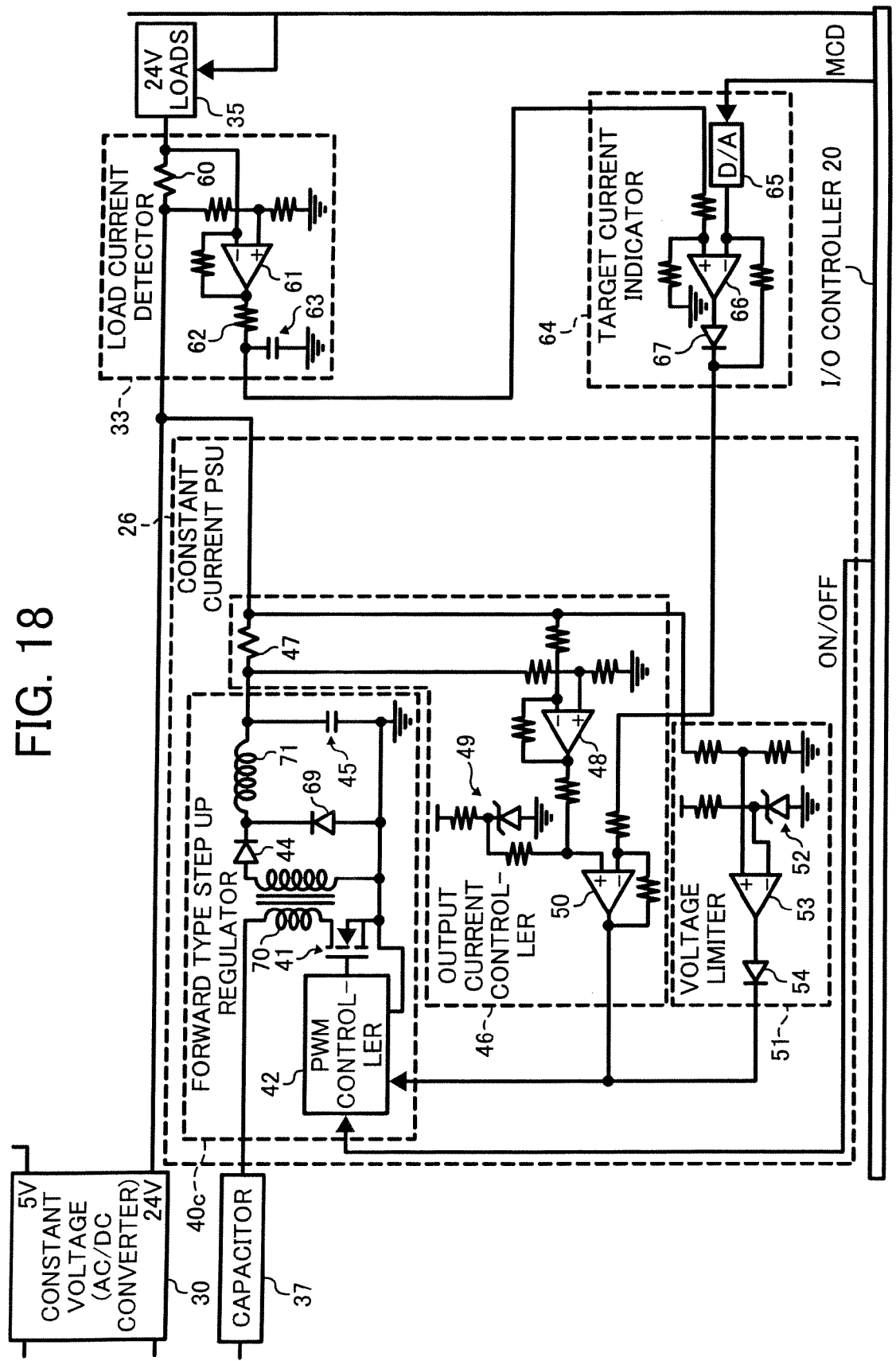
FIG. 18 is a circuit diagram of a second power supply unit 26 in another embodiment of the invention.

FIG. 18 shows another embodiment of the constant current PSU 26. In this embodiment, the step up regulator 40 in FIG. 6 is replaced with a forward type step up regulator 40*c* and the on-off controller 55 is removed. However, the other structures are the same. Consequently, the descriptions of the other structures are abbreviated here. In this embodiment, the step up regulator 40*c* is provided with the step up transformer 70. While an on-off signal from the I/O controller 20 indicates on, the PWM controller 42 controls the on-state duty of the switch 41 with the PWM pulse which is controlled based on the difference signal from the differential amplifier 50 and keeps the output voltage of the constant current PSU 26 +24V. If the PWM pulse from the PWM controller 42 stops, then the switch 41 stays off and interrupts a current flow in the primary wire of the transformer 70. Thus, the discharge of the capacitor 37 also stops. In this embodiment, the on-off controller 55 can be omitted and if the transformer 70 is a step down type transformer, then the step up regulator 40*c* can be replaced by the step down type regulator.

Figure 19:
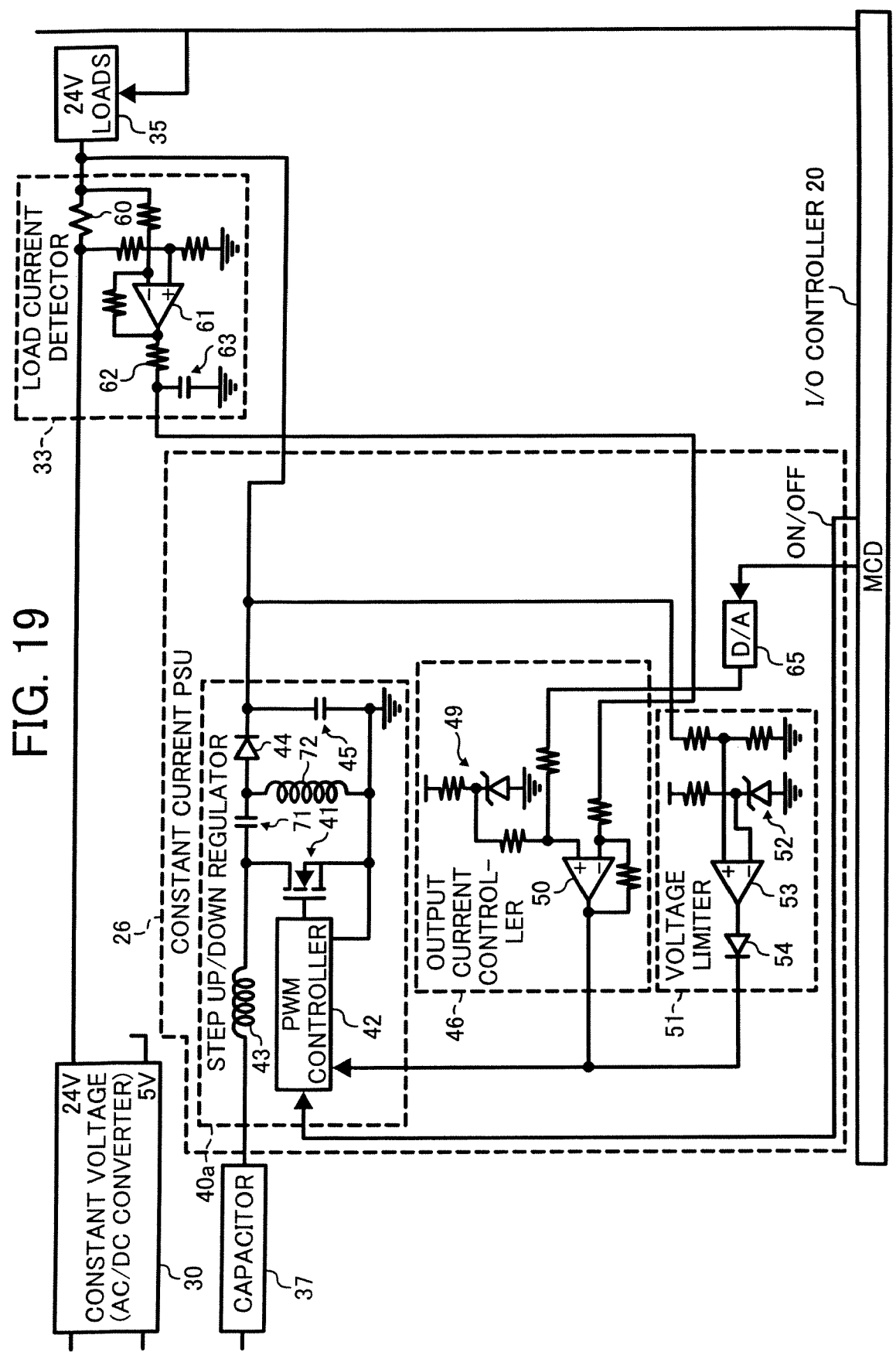
FIG. 19 is a circuit diagram of a second power supply unit 26 in another embodiment of the invention.

FIG. 19 shows another embodiment of the constant current PSU 26. In this embodiment, the step up regulator 40 in FIG. 14 is replaced with a single-ended primary-inductance converter (SEPIC) type step up/down regulator 40*d* and the on-off controller 55 is removed. However, the other structures are the same. Consequently, the descriptions here for the others structures are abbreviated. In this embodiment, the SEPIC type step up/down regulator 40*d* is provided with a capacitor 71 and a reactor 72 for stepping down between the switch 41 and the diode 44 and the capacitor 45 of the step up regulator 40 in FIG. 14. When the on-off signal from the I/O controller 20 changes from an on-state to an off-state, then the PWM controller 42 stops the PWM signal to the switch 41 and the switch 41 turns off. In this case, the capacitor 71 interrupts the current flow from the capacitor 37 to the diode 44. Consequently, the discharge of the capacitor 37 also stops. In this embodiment, the on-off controller 55 can be omitted.

Further, in this embodiment, the discharge stop voltage Vcs is also set to half of the maximum capacitor voltage, and ten to nineteen electric double layer capacitor cells are connected serially to supply +24V. Like the embodiment shown in FIG. 16, the maximum capacitor voltage increases higher than +24V and the discharge stop voltage Vcs decrease lower than +24V.

When the switch 41 changes from the off-state to the on-state, then the capacitor 37 discharges through the reactor 43 and the switch 41, and a charge in the capacitor 71 also starts to discharge through the switch 41. Further, the reactor 72 starts to accumulate power. In this situation, the capacitor 45 is already charged and the diode 44 is biased in reverse. Therefore, the diode 44 stops the current flow to the capacitor 71. When the switch 41 changes from the on-state to the off-state, then the capacitor 37 discharges through the reactor 43, the capacitor 71, the diode 44, and the capacitor 45. The accumulated power in the reactor 72 also starts to discharge through the diode 44. The capacitor 45 starts to charge and also the capacitor 71 starts to charge.

Supposing the capacitor voltage of the capacitor 37 is Ein, the capacitor voltage of the capacitor 45 Eout, and the on-duty of the switch 41 controlled by the PWM controller 42 is D, then the following equation is satisfied.

$$Eout = Ein/(1-D)$$

The capacitor voltage of the capacitor 45 is constant and almost +24V; thus, if the capacitor voltage Ein is high, then the supplying current from the SEPIC type step up/down regulator 40 to the +24V loads becomes high and the supplying current from the constant voltage 30 becomes low. Thus, the load current detected by the load current detector 33 becomes low and that causes the PWM controller 42 to make the on-duty of the switch 41 decrease. Conversely, if the capacitor voltage Ein of the capacitor 37 is low, then the on-duty of the switch 41 becomes high. Therefore, the on-duty of the switch 41 is automatically changed based on the capacitor voltage of the capacitor 37.

If the MCD is set to high, then the differential signal from the output current controller 46 to the PWM controller 42 becomes high and the on-duty of the PWM signal from the PWM controller 42 decreases. If the MCD is set to low, then the differential signal from the output current controller 46 to the PWM controller 42 becomes low and the on-duty of the PWM signal from the PWM controller 42 increases.

What is claimed is:

1. A power supply unit, comprising:
    a first power supply unit configured to convert an AC power provided by an outlet to a first DC power; and
    a second power supply unit configured to accumulate power provided by the outlet and to convert the accumulated power to a second DC power;
    wherein, the second DC power is added to the first DC power on a line which supplies power to external DC loads and the combined DC power is supplied to the external DC loads using the line.

2. The power supply unit according to claim 1, wherein the first power supply unit is configured to output a constant voltage DC power and the second power supply unit is configured to output a constant current DC power.

3. The power supply unit according to claim 1, further comprising:
    a current detector configured to detect a load current flowing through the external DC loads;
    a maximum current outputting unit configured to output a maximum current of the first power supply unit;
    a target current outputting unit configured to output a target current of the second power supply unit based on the detected load current and the maximum current; and
    an output current controller configured to control an output current of the second power supply unit based on the target current.

4. The power supply unit according to claim 3, wherein the target current outputting unit sets a difference between the maximum current and the load current as the target current.

5. The power supply unit according to claim 1, further comprising:
    a current detector configured to detect an output current of the first power supply unit;
    a maximum current outputting unit configured to output a maximum current of the first power supply unit;
    a output current controller configured to control a output current of the second power supply unit based on the detected output current of the first power supply unit and the maximum current of the first power supply unit.

6. The power supply unit according to claim 5, wherein the output current controller controls the output current of the second power supply unit to equalize the maximum current of the first power supply unit and the output current of the first power supply unit.

7. A printing apparatus, comprising:
    a first power supply unit configured to convert an AC power from an outlet to a first DC power;
    a second power supply unit configured to accumulate power from the outlet and to convert an accumulated power to a second DC power;
    wherein the second DC power is added to the first DC power on a line which supplies power to DC loads of the printing apparatus and the combined power is supplied to the DC loads of the printing apparatus using the line.

8. The printing apparatus according to claim 7, wherein the first power supply unit is configured to output a constant voltage DC power and the second power supply unit is configured to output a constant current DC power.

9. The printing apparatus according to claim 7, further comprising:
    a current detector configured to detect a load current flowing through the DC loads;
    a maximum current setting unit configured to set a maximum current of the first power supply unit;
    a target current outputting unit configured to output a target current of the second power supply unit based on the load current and the maximum current; and
    an output current controller configured to control an output current of the second power supply unit based on the target current.

10. The printing apparatus according to claim 9, wherein the target current outputting unit outputs a difference between the maximum current and the detected load current as the target current.

11. The printing apparatus according to claim 9 further comprising:
    a heater;
    a heater controller configured to control a heating power of the heater;
    a heater power setting unit configured to set a maximum power of the heater; and
    a controller configured to control the maximum current of the first power supply unit and the heating power of the heater;
    wherein the controller controls a total power, which is a maximum power of the first power supply unit corresponding to the maximum current plus the heating power of the heater, within a rated power of the outlet.

12. The printing apparatus according to claim 11, wherein the controller increases the heating power by decreasing the maximum power of the first power supply.

13. The printing apparatus according to claim 7, further comprising:
    a current detector configured to detect an output current of the first power supply unit;
    a maximum current outputting unit configured to output a maximum current of the first power supply unit; and
    an output current controller configured to control an output current of the second power supply unit based on the output current of the first power supply unit and the maximum current of the first power supply unit.

14. The printing apparatus according to claim 13, wherein the output current controller controls the output current of the second power supply unit to equalize the maximum current of the first power supply unit and the output current of the first power supply unit.

15. The printing apparatus according to claim 13 further comprising:
    a heater;
    a heater controller configured to control a heating power of the heater;
    a heater power setting unit configured to set a maximum power of the heater;
    a controller configured to control the maximum current of the first power supply unit and the heating power of the heater;
    wherein the controller controls a total power, which is a maximum power of the first power supply unit corresponding to the maximum current plus the heating power of the heater, within a rated power of the outlet.

16. A printing apparatus according to claim 15, wherein the controller controls the heating power to increase by decreasing the maximum power of the first power supply.

17. A power supply unit, comprising:
    means for converting an AC power provided by an outlet to a first DC power;
    means for accumulating power provided by the outlet and for converting the accumulated power to a second DC power;

means for adding the second DC power to the first DC power on a line which supplies power to external DC loads; and means for supplying the combined DC power to the external DC loads using the line.

18. A printing apparatus, comprising:

means for converting an AC power from an outlet to a first DC power;

means for accumulating power from the outlet and for converting an accumulated power to a second DC power;

means for adding the second DC power to the first DC power on a line which supplies power to DC loads of the printing apparatus; and means for supplying the combined power to the DC loads of the printing apparatus using the line.

19. A method for supplying power comprising:

converting using a first power supply unit an AC power provided by an outlet to a first DC power;

accumulating using a second power supply unit power provided by the outlet and converting the accumulated power to a second DC power;

adding the second DC power to the first DC power on a line which supplies power to external DC loads; and supplying the combined DC power to the external DC loads using the line.

20. The method of claim 19, further comprising:

detecting a load current flowing through the external DC loads;

outputting a maximum current of the first power supply unit;

outputting a target current of the second power supply unit based on the detected load current and the maximum current; and controlling an output current of the second power supply unit based on the target current.

\* \* \* \* \*